(12) United States Patent
Jamadagni et al.

(10) Patent No.: US 12,713,316 B2
(45) Date of Patent: Aug. 18, 2026

(54) SYSTEMS AND METHODS FOR INTER RADIO INTELLIGENT CONTROLLER COMMUNICATION

(71) Applicant: JIO PLATFORMS LIMITED, Ahmedabad (IN)

(72) Inventors: Satish Nanjunda Swamy Jamadagni, Bangalore (IN); Mathew Oommen, Mumbai (IN); Mahesh Nayaka Mysore Annaiah, Bangalore (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 459 days.

(21) Appl. No.: 18/028,554

(22) PCT Filed: Sep. 29, 2022

(86) PCT No.: PCT/IB2022/059293

§ 371 (c)(1),
(2) Date: Mar. 26, 2023

(87) PCT Pub. No.: WO2023/053057

PCT Pub. Date: Apr. 6, 2023

(65) Prior Publication Data

US 2024/0357458 A1    Oct. 24, 2024

(30) Foreign Application Priority Data

Sep. 29, 2021 (IN) ............................. 202121044212

(51) Int. Cl.

| | |
|---|---|
| ***H04W 36/22*** | (2009.01) |
| ***H04L 5/00*** | (2006.01) |
| ***H04W 36/00*** | (2009.01) |

(52) U.S. Cl.

CPC ........... *H04W 36/22* (2013.01); *H04L 5/0055* (2013.01); *H04W 36/00837* (2018.08); *H04W 36/0085* (2018.08)

(58) Field of Classification Search

CPC ........... H04W 36/22; H04W 36/00837; H04W 36/0085; H04W 36/00835; H04W 88/085;

(Continued)

(56) References Cited

U.S. PATENT DOCUMENTS

| | | | | |
|---|---|---|---|---|
| 11,337,131 | B1 * | 5/2022 | Parekh .................. | H04W 36/22 |
| 2020/0383040 | A1 * | 12/2020 | Young .................. | H04W 88/18 |

(Continued)

OTHER PUBLICATIONS

Kuklinski et al., On O-RAN, MEC, SON and Network Slicing integration, Dec. 7, 2020, IEEE, 6 pages.*

*Primary Examiner* — Kan Yuen

(74) *Attorney, Agent, or Firm* — Davé Law Group, LLC; Raj S. Davé

(57) ABSTRACT

Present disclosure generally relates to wireless telecommunication networks, and more particularly relates to systems and methods for inter radio intelligent controller communication. The system and methods realize an inter Near-RT RIC communication to enable the near real-time control and optimization of E2 Nodes across an entire Heterogeneous Networks (HetNets) irrespective of number of Near-RT RICs deployed. Embodiments herein provides different architectural options to enable Inter Near-RT RIC communications. Embodiments herein provides specific mechanisms of data exchange and the associated procedures.

22 Claims, 16 Drawing Sheets

(58) Field of Classification Search
CPC ..... H04W 88/18; H04W 92/24; H04W 24/02; H04W 88/12; H04L 5/0055
See application file for complete search history.

(56) References Cited

U.S. PATENT DOCUMENTS

| | | | | |
|---|---|---|---|---|
| 2022/0116799 | A1* | 4/2022 | Wang | H04W 28/16 |
| 2022/0124543 | A1* | 4/2022 | Orhan | G06N 3/006 |
| 2022/0159525 | A1* | 5/2022 | Chou | H04W 36/0058 |
| 2022/0232452 | A1* | 7/2022 | Sivaraj | H04W 8/26 |
| 2022/0295309 | A1* | 9/2022 | Akhtar | H04W 24/02 |

* cited by examiner

SYSTEMS AND METHODS FOR INTER RADIO INTELLIGENT CONTROLLER COMMUNICATION

CROSS-REFERENCE TO RELATED APPLICATION(S)

This application is a National Stage of International Application No. PCT/IB2022/059293, filed on Sep. 29, 2022, which claims priority to Indian Patent Application No. 202121044212, filed Sep. 29, 2021, the disclosures of which are hereby incorporated by reference in their entirety.

FIELD OF INVENTION

The embodiments of the present disclosure generally relate to wireless telecommunication networks. More particularly, the present disclosure relates to systems and methods for inter radio intelligent controller communication.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, as cellular networks evolve from Fourth Generation (4G), Fifth Generation (5G) and then to Sixth Generation (6G) along with other radio access technologies such as Wireless-Fidelity (Wi-Fi), the mobile subscriptions may also be increasing exponentially. Accordingly, a network operator may be forced to deploy high-density Heterogeneous Networks (HetNets) to fulfil the demands of subscribers. The HetNets may generally be built by multi-portfolio and/or multi-vendor-based solutions. The key challenges that the network operator may face during the greenfield or brownfield deployments of the HetNets is the demand for high quality installations. The high-quality installations may include continuous monitoring of performance and health of the deployed networks, dynamically adapting to changing environments, proactive adjustments and optimization.

The aforementioned challenges may require high manual work, delay due to regular/frequent field visits and hence leading to very huge Operational Expenses (OPEX). Further, an Open Radio Access Network (O-RAN) architecture may not provide any provision for the interface between any two Near Real-Time Radio Intelligent Controllers (Near-RT RICs). The conventional systems may not provide mechanisms to realize the inter Near-RT RIC communications in an O-RAN architecture. The O-RAN architecture has specified all the interfaces from Near-RT RIC to E2 nodes and to Service Management and Orchestration (SMO) system. As the network grows in the HetNet, there may be a great demand to deploy multiple Near-RT RICs across the network. This creates a geographic areas or boundaries controlled by each of the Near-RT RICs. In O-RAN architecture, inter Near-RT RIC communication may not be defined and may lead to problems for smooth network control operations and optimizations along the RIC boundaries.

Hence, there is need to overcome aforementioned deficiencies and to drastically reduce the OPEX. Therefore, there is a need in the art to provide systems and methods that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide an efficient, improved, and reliable systems and methods for inter Radio Intelligent Controller (RIC) communication.

Another object of the present disclosure is to provide direct interface between two Radio RICs.

Another object of the present disclosure is to provide systems and methods for exchanging analytics data between RICs and to predict the load situations on probable candidate cells and take advanced measures to avoid such loading among those candidate cells.

Another object of the present disclosure is to enable near real-time control and optimize E2 nodes across the entire HetNet irrespective of number of Near-RT RICs deployed.

Another object of the present disclosure is to provide different architectural solutions to enable inter Near-RT RIC communications.

Another object of the present disclosure is to provide specific mechanisms of data exchange and the associated procedures.

Another object of the present disclosure is to provide split mechanism between different entities in a O-RAN architecture and the associated data/control flow mechanisms.

Another object of the present disclosure is to provide advanced measures for a traffic steering to appropriate cells of same or multi-RAT for the entire predicted time duration, including traffic switching and traffic splitting. These advanced measures aids in providing and sustaining good end-to-end Quality of Experience (QoE).

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for inter radio intelligent controller communication in an open Radio Access Network (O-RAN). The system may include a network device equipped with a Non-Real Time Radio Intelligent Controller (Non-RT RIC) and communicatively coupled to a Near-Real Time Radio Intelligent Controller (Near-RT RIC). The network device may be further operatively coupled to a plurality of cells in the heterogenous network, the plurality of cells further communicatively coupled to an open radio access network unit (O-RAN). The network device may further include a processor and a memory. The memory may include processor-executable instructions corresponding to one or more xAPPs associated with the Near-RT RIC, which on execution, cause the network device to receive, a first set of instructions to split the Near-RT RIC into a plurality of Near-RT RIC modules, create a logical interface among the plurality of Near-RT RIC modules and, establish a communication pathway among the plurality of Near-RT RIC modules through the logical interface. The communication pathway enable a near real-time control and optimization of a plurality of E2 Nodes across the entire heterogenous network.

In an embodiment, the network device may be further configured to: detect, by a first Near RT RIC module, a new neighbour cell in an Automatic Neighbour Relation (ANR) module associated with a current RIC which is not supported or registered in the current RIC, determine, by the first Near RT RIC module, location of the new neighbour cell and send, by the first Near RT RIC module, the location of the new neighbour cell to a management entity associated with the network device via an O1 interface.

In an embodiment, the network device may be further configured to send an RIC information request message to the management entity at the network device via an O1 interface. The RIC information request message may include of a cell Identity (ID) of the new neighbour cell. The network device may further search a cell-RIC map for the cell ID and locate one or more RIC details associated with the new neighbour cell and respond, by the network device, with the new neighbour cell's RIC transport layer address by sending RIC Information Response message to the first Near-RT RIC module.

In an embodiment, the network device may be further configured to: initiate, by the first Near-RT RIC module, a setup procedure to establish an INear-RT RIC interface link with a second Near-RT RIC that is associated with the new neighbour cell's RIC, at the reception of the new neighbour cell's RIC transport layer address then send, by the first Near-RT RIC module, a Near-RT RIC setup request message (INear-RT RIC) to the second Near-RT RIC with a list of supported cells associated with the new neighbour cell. The second Near-RT RIC module may acknowledge the Near-RT RIC setup request message and update the list of supported cells with a received list of cells from the network device and then the first Near-RT RIC module may respond back, by sending the Near-RT RIC setup response message with the list of supported cells and also update the list of supported cells with the received list of cells to successfully establish between the link between the first Near-RT RIC and the second Near-RT RIC.

In an embodiment, the network device may be further configured to send a Near-RT RIC cell information request message to the second Near-RT RIC, by providing cell ID or a list of cell IDs, to request load information, measurement information, data analytics information.

In an embodiment, the network device may be further configured to register, by the second the Near-RT RIC module, the Near-RT RIC cell information request; and respond back, by the second the Near-RT RIC module, with the latest load information, measurement information, data analytics information by sending the Near-RT RIC cell information response message to the first Near-RT RIC module.

In an embodiment, the network device may be further configured to take decisions, by the first Near-RT RIC module, for a Self-Organizing Network (SON), on one or more cells which belong to a different RIC.

In an embodiment, the network device may be further configured to: update, by the second Near RT-RIC module, an RIC configuration of an INear-RT RIC interface link when a cell or a group of cells are added or deleted and/or modified certain parameters of a cell/cells, send the Near-RT RIC config update message to the first Near-RT RIC module, update, by the first near RT-RIC module, the supported list of cells; and, respond back by the first near RT-RIC by sending the Near-RT RIC configuration update acknowledge message to the second Near-RT RIC.

In an embodiment, the network device may be further configured to: send, by the second Near RT RIC module, a Near-RT RIC command with needed handover (HO) trigger details, and a predefined set of measurements to the first Near-RT RIC, if the second Near-RT RIC-2 decides to alter the HO trigger details of a cell which belongs to a different RIC. Upon reception of the Near RT RIC command, the first Near-RT RIC-module may acknowledge the Near-RT RIC command; and then respond back the Near-RT RIC command acknowledge message to the second Near-RT RIC module.

In an embodiment, the network device may be further configured to split data and control flow mechanism between the plurality of Near-RT RIC modules and steer traffic to appropriate cells for the entire predicted time duration. The steering of traffic may include traffic switching and traffic splitting based on the split data and control flow mechanism.

In an aspect, the present disclosure provides for inter radio intelligent controller communication in an open Radio Access Network (O-RAN). The system may include a network device communicatively coupled to a Near-Real Time Radio Intelligent Controller (Near-RT RIC). The network device may further operatively coupled to a plurality of cells in the heterogenous network, the plurality of cells further communicatively coupled to an open radio access network unit (O-RAN) The network device may further include a processor and a memory. The memory may include processor-executable instructions corresponding to one or more xAPPs associated with the Near-RT RIC, which on execution, cause the network device to: receive, a first set of instructions to split the Near-RT RIC into a plurality of Near-RT RIC modules; create a logical interface among the plurality of Near-RT RIC modules; and, establish a communication pathway among the plurality of Near-RT RIC modules through the logical interface. Furthermore, the communication pathway comprises steps as: initiate, by the first Near-RT RIC module, a setup procedure to establish an INear-RT RIC interface link with a second Near-RT RIC that is associated with the new neighbour cell's RIC, at the reception of the new neighbour cell's RIC transport layer address; send, by the first Near-RT RIC module, a Near-RT RIC setup request message (INear-RT RIC) to the second Near-RT RIC with a list of supported cells associated with the new neighbour cell; acknowledge, by the second Near-RT RIC module, the Near-RT RIC setup request message (Near-RT RIC); update, by the second Near-RT RIC module, the list of supported cells with a received list of cells from the network device; respond back, by the first Near-RT RIC module by sending the Near-RT RIC setup response message with the list of supported cells; and update, by the first Near-RT RIC module, the list of supported cells with the received list of cells to successfully establish between the link between the first Near-RT RIC and the second Near-RT RIC.

In an aspect of the present invention, the network device may be further configured to send a setup request message. The setup request message may include at least of an IP address, a destination allocation ID, a source allocation ID, a data set of one or more connected E2 nodes of Near-RT RIC.

In an aspect, the present disclosure provides for a method for inter radio intelligent controller communication in an open Radio Access Network (O-RAN). The method may include the steps of receiving, by a network device, a first set of instructions to split the Near-RT RIC into a plurality of Near-RT RIC modules. The network device may be equipped with a Non-Real Time Radio Intelligent Controller (Non-RT RIC) and communicatively coupled to a Near-Real Time Radio Intelligent Controller (Near-RT RIC). The network device may be further operatively coupled to a plurality of cells in the heterogenous network, the plurality of cells further communicatively coupled to an open radio access network unit (O-RAN). The network device further may include a processor and a memory, the memory may include processor-executable instructions corresponding to one or more xAPPs associated with the Near-RT RIC. The method may further include the step of creating, by the network device, a logical interface among the plurality of Near-RT RIC modules and, establishing, by the network device, a communication pathway among the plurality of Near-RT RIC modules through the logical interface. The communication pathway may enable a near real-time control and optimization of a plurality of E2 Nodes across the entire heterogenous network.

In an aspect, the present disclosure provides for a method for inter radio intelligent controller communication in an open Radio Access Network (O-RAN). The method may include the steps of receiving, by a network device, a first set of instructions to split the Near-RT RIC into a plurality of Near-RT RIC modules. The network device may be communicatively coupled to a Near-Real Time Radio Intelligent Controller (Near-RT RIC). The network device may be further operatively coupled to a plurality of cells in the heterogenous network, the plurality of cells further communicatively coupled to an open radio access network unit (O-RAN). The network device further may include a processor and a memory, the memory may include processor-executable instructions corresponding to one or more xAPPs associated with the Near-RT RIC. The method may further include the step of creating, by the network device, a logical interface among the plurality of Near-RT RIC modules and, establishing, by the network device, a communication pathway among the plurality of Near-RT RIC modules through the logical interface. The communication pathway may comprise steps as initiating, by the first Near-RT RIC module, a setup procedure to establish an INear-RT RIC interface link with a second Near-RT RIC that is associated with the new neighbour cell's RIC, at the reception of the new neighbour cell's RIC transport layer address; sending, by the first Near-RT RIC module, a Near-RT RIC setup request message (INear-RT RIC) to the second Near-RT RIC with a list of supported cells associated with the new neighbour cell; acknowledging, by the second Near-RT RIC module, the Near-RT RIC setup request message (INear-RT RIC); updating, by the second Near-RT RIC module, the list of supported cells with a received list of cells from the network device; responding back, by the first Near-RT RIC module by sending the Near-RT RIC setup response message with the list of supported cells; and updating, by the first Near-RT RIC module, the list of supported cells with the received list of cells to successfully establish between the link between the first Near-RT RIC and the second Near-RT RIC.

In an aspect, the method may further include the step of sending a setup request message by the network device, and the setup request message may include at least of an IP address, a destination allocation ID, a source allocation ID, a data set of one or more connected E2 nodes of Near-RT RIC.

In an aspect, the present disclosure provides for a user equipment connected in a network in an open Radio Access Network (O-RAN). The user equipment may comprise a receiver, and a processor configured to control the receiver. The processor may be configured to receive a copy of an updated list of RICs and the associated E2 nodes via RRC message from network device. Further, the list is updated once the source RIC receive an inter RIC setup response message from the target RIC via interface, and wherein the user equipment is configured to dynamically use the updated list to select an optimized neighbour cell and a RIC.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present disclosure provides an efficient, improved, and reliable systems and methods for inter Radio Intelligent Controller (RIC) communication. The present disclosure provides direct interface between two Radio RICs. The present disclosure provides systems and methods for exchanging analytics data between RICs and to predict the load situations on probable candidate cells and take advanced measures to avoid such loading among those candidate cells. The present disclosure enables near real-time control and optimize E2 nodes across the entire HetNet irrespective of number of Near-RT RICs deployed. The present disclosure provides different architectural solutions to enable inter Near-RT RIC communications. The present disclosure provides specific mechanisms of data exchange and the associated procedures. The present disclosure provides split mechanism between different entities in a O-RAN architecture and the associated data/control flow mechanisms. The present disclosure provides advanced measures for a traffic steering to appropriate cells of same or multi-RAT for the entire predicted time duration, including traffic switching and traffic splitting. These advanced measures aids in providing and sustaining good end-to-end Quality of Experience (QoE).

Figure 1A:
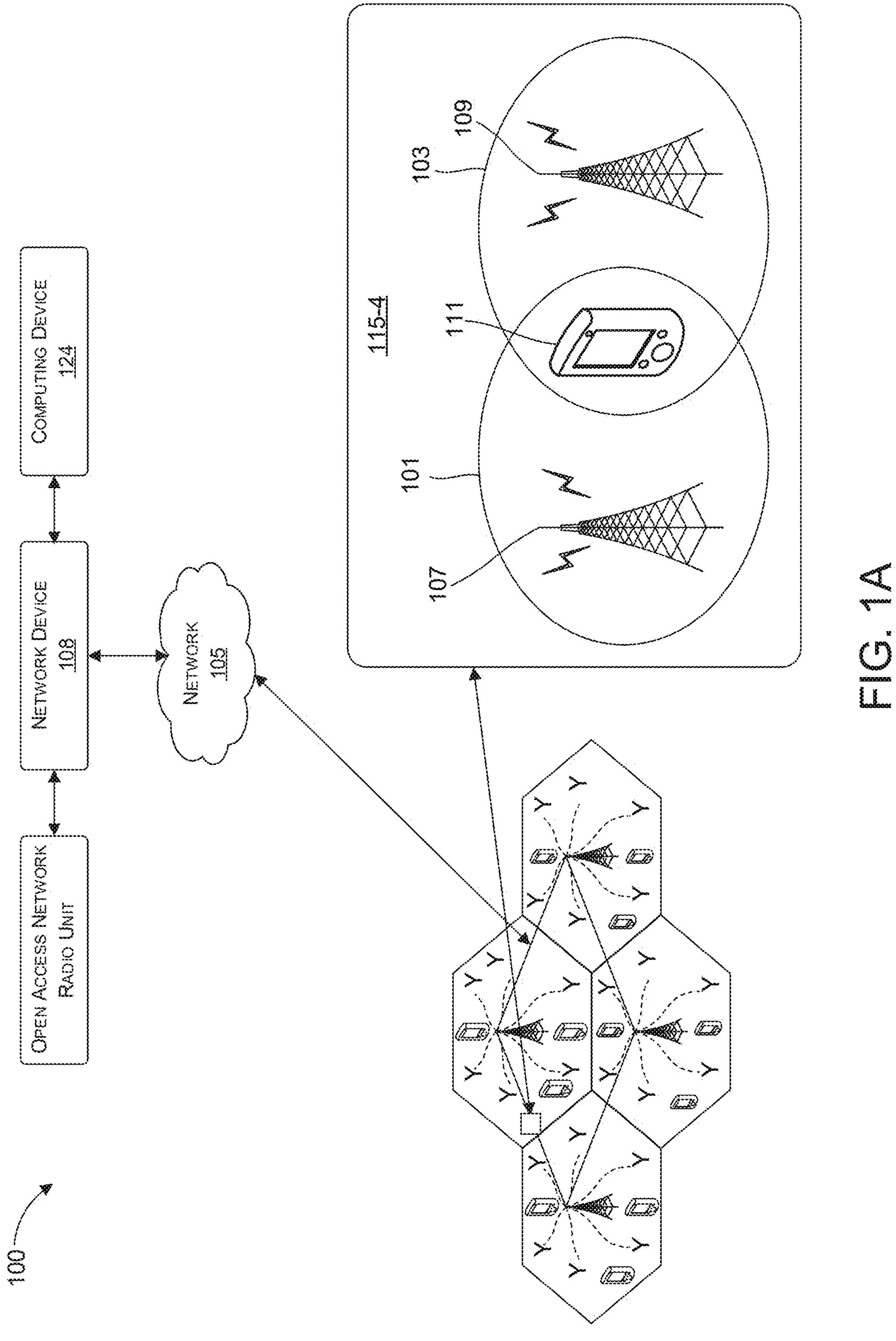
FIG. 1A illustrates an exemplary network architecture in which or with which proposed system of the present disclosure can be implemented, in accordance with an embodiment of the present disclosure.

FIG. 1A illustrates an exemplary network architecture in which proposed system (100) of the present disclosure can be implemented, in accordance with an embodiment of the present disclosure. FIG. 1A, illustrates a plurality of cells (115-1, 115-2, . . . 115-N) (also referred individually as cell (115) and collectively as cells (115)) operatively coupled to a network device (108) through a heterogenous network (105). For example, a heterogenous network may consist of two or more types of nodes organized into hierarchical clusters. The heterogenous network (or simply referred to as the network (105) herein) may be wireless and wireline and can support 2G, 3G, 4G, LTE, 5G, 6G and other next generation communication services. Each cell (115) may include a base station (117). To explain the working of the plurality of cells (115) more clearly to a person not skilled in the art, a rectangular cross section (115-4) in the plurality of cells (115) is depicted that shows a mobile device (also called a mobile station or MS) (111), a first cell (107), and a second cell (109). The first cell (107) has a first cell region (101) and the second cell (109) has a second cell region (103) in order to offer communication service. The mobile device (111) located in an overlapped area of the first cell region (101) and the second cell region (103) can transmit/receive signals to/from the network (105) through the adjacent cell (107) or (109).

Figure 1B:
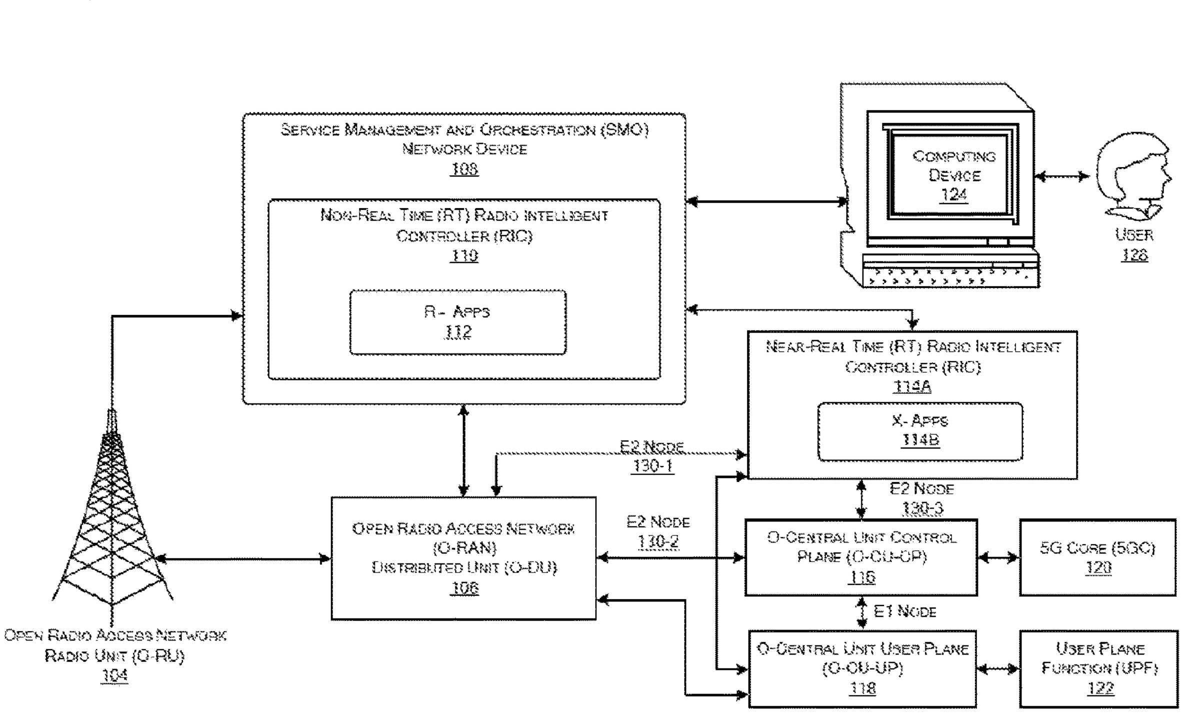
FIG. 1B illustrates an exemplary detailed architecture (150) of the network device in which or with which proposed system of the present disclosure can be implemented, in accordance with an embodiment of the present disclosure.

The network device (108) may be further associated with an open radio access radio unit (O-RU) (104) and one or more first computing devices (124-1, 124-2 . . . 124-N) (individually referred to as the computing device (124) and collectively referred to as the computing devices (124)) which will be thereby explained in FIG. 1B.

Referring to FIG. 1B that illustrates an exemplary detailed architecture (150) of the network device (108) (also referred to as a Service Management and Orchestration (SMO) system (108) or simply referred to as the SMO device (108)) and one or more modules associated with the network device (108) of the present disclosure can be implemented, in accordance with an embodiment of the present disclosure. As illustrated, the exemplary network architecture (100) may be equipped with Non-Real Time Radio Intelligent Controller (Non-RT RIC) (110) associated with the SMO system (108), and Near-Real Time Radio Intelligent Controller (Near-RT RIC) (114A) for retrieving Radio Access Network (RAN) information over E2 interface of an Open Radio Access Network (O-RAN), using information request response procedure based on schemes received from users (128-1, 128-2, 128-3, . . . , 128-N) (individually referred to as the user (128) and collectively referred to as the users (128)) associated with one or more computing devices (124-1, 124-2, . . . , 124-N) (individually referred to as the computing device (124) and collectively referred to as the computing devices (124)). The SMO system (108) may be further operatively coupled to mobile devices (not shown in FIG. 1), via an Open radio access network Radio Unit (O-RU) (104). The SMO (108) may be communicatively coupled to the one or more computing devices (individually referred to as the computing device (124) and collectively referred to as the computing devices (124)).

Further, the Non-RT RIC (110) may include rApps (112) and the Near-RT RIC (114A) may include xApps (114B). The SMO system (108) and the Near-RT RIC (114A) may be coupled to an Open radio access network Distributed Unit (O-DU) (106). The O-DU (106) may be coupled to an Open radio access network Central Unit Control Plane (O-CU-CP) (116) and an Open radio access network Central Unit User Plane (O-CU-UP) (118). The Near-RT RIC (114A) may also be coupled to the O-CU-CP (116) and the O-CU-UP (118). The O-CU-CP (116) may be coupled to the O-CU-UP (118). Further, the O-CU-CP (116) may be coupled to the Fifth-Generation (5G) Core (5GC) (120) and the O-CU-UP (118) may be coupled to a User PlaneFunction (UPF) (122).

In an embodiment, the Near-RT RIC (114A) may be split into a plurality of Near-RT RIC modules such as a Near-RT RIC (also referred to as Near-RT RIC-0), a first Near-RT RIC, (also referred to as Near-RT RIC-1), a second Near-RT RIC, (also referred to as Near-RT RIC-2), and so on. In an embodiment, the Near-RT RIC-1 may detect a new neighbour cell in an Automatic Neighbour Relation (ANR) table which may not be supported or registered in the current RIC. In an embodiment, the Near-RT RIC-1 may then find new neighbour cell belongs, which to the RIC in the by sending a O1:RIC information request message to the management entity at SMO via O1 interface. The message may include cell Identity (ID) of the new neighbour cell. The SMO (108) may search associated cell-RIC mapping table for the cell ID and locate the respective RIC details. The SMO (108) may respond back with the new neighbour cell's RIC transport layer address by sending O1:RIC Info Response message to the Near-RT RIC-1. At the reception of the Near-RT RIC-2's transport layer address, the Near-RT RIC-1 may initiate a setup procedure to establish an INear-RT RIC interface link with Near-RT RIC-2. The Near-RT RIC-1 may send a INear-RT RIC: Near-RT RIC setup request message to Near-RT RIC-2 with associated list of supported cells. Further, Near-RT RIC-2 may acknowledge the request, and update supported cell list table with the received list of cells and respond back by sending INear-RT RIC: Near-RT RIC setup response message with supported list of cells. At the reception of the response message, the Near-RT RIC-1 may update supported cell list table with the received list of cells. Now, the INear-RT RIC link may be successfully established between the two RICs.

In an embodiment, Near-RT RIC-1 may send a request by sending INear-RT RIC: Near-RT RIC cell information request message to Near-RT RIC-2, by providing cell ID or a list of cell IDs, to request load information, measurement information, data analytics information, and so on, by setting appropriate flags, for each requested cell. At the reception of the Near-RT RIC cell information request, the Near-RT RIC-2 may register the Near-RT RIC cell information request, and may respond back with the latest load information, measurement information, data analytics information, and so on, by sending INear-RT RIC: Near-RT RIC cell info response message to Near-RT RIC-1. Further, Near-RT RIC-1 may have all the data necessary for taking decisions for Self-Organizing Network (SON), on the cells which belongs to a different RIC.

In an embodiment, the RIC configuration of a INear-RT RIC interface link may be updated. When a cell or a group of cells are added or deleted and/or modified certain parameters of a cell/cells, then the Near-RT RIC-2 may indicate, by sending INear-RT RIC: Near-RT RIC config update message to the Near-RT RIC-1. At the reception, the Near-RT RIC-1 may update supported cell list table and respond back by sending INear-RT RIC: Near-RT RIC configuration update acknowledge message to the Near-RT RIC-2.

In another embodiment, the commands in the INear-RT RIC interface link may be sent. If Near-RT RIC-2 decide to alter Handover (HO) trigger parameter of a cell which belongs to a different RIC, the Near-RT RIC-2 may send the INear-RT RIC: Near-RT RIC command with needed HO trigger details, related measurements if any to the Near-RT RIC-1. At the reception, the Near-RT RIC-1 may acknowledge the command and respond back by sending INear-RT RIC: Near-RT RIC command acknowledge message to the Near-RT RIC-2. Further, the Near-RT RIC-1 may execute the received commands and the Near-RT RIC-2 may execute the local actions if anything planned.

In yet another embodiment, updates on load information, measurement information, data analytics information, and so on, at requested Near-RT RIC to the Requestee Near-RT RIC on an INear-RT RIC interface link may be indicated.

In an embodiment, an onsite data capture, storage, matching, processing, decision-making and actuation logic may be coded using Micro-Services Architecture (MSA) but not limited to it. A plurality of microservices may be containerized and may be event based in order to support portability.

In an embodiment, the network architecture (100) may be modular and flexible to accommodate any kind of changes in the SMOsystem (108), and the Near-RT RIC (114A) as proximate processing may be acquired towards retrieving Radio Access Network (RAN)information over E2 interface of an Open Radio Access Network (O-RAN), using information request response procedure. The SMOsystem (108), and the Near-RT RIC (114A) configuration details can be modified on the fly.

In an embodiment, the SMO system (108)/Near-RT RIC (114A) may be remotely monitored and the data, application and physical security of the SMO system (108)/Near-RT RIC (114A) may be fully ensured. In an embodiment, the data may get collected meticulously and deposited in a cloud-based data lake to be processed to extract actionable insights. Therefore, the aspect of predictive maintenance can be accomplished.

In an embodiment, the user equipment (UE) connected in the network in an open Radio Access Network (O-RAN) may include a receiver (not shown in FIG. 1A), and a processor configured to receive a copy of an updated list of RICs and the associated E2 nodes via RRC message from network device (108). The list may be updated once the source RIC receive an inter RIC setup response message from the target RIC via interface, and wherein the user equipment is configured to dynamically use the updated list to select an optimized neighbour cell and a RIC.

In an exemplary embodiment, a communication network (not shown in FIG. 1) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, a server (not shown in FIG. 1) may be included in architecture (100). The Near-RT RIC (114A) and the SMO system (108) may be implemented on the server. The server may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more computing devices (124), the one or more mobile devices (not shown in FIG. 1) may communicate with the SMO system (108)/Near-RT RIC (114A) via set of executable instructions residing on any operating system, including but not limited to, Android™, iOS™, Kai OS™ and the like. In an embodiment, one or more computing devices (224) and the one or more mobile devices may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (124), and the one or more mobile devices may not be restricted to the mentioned devices and various other devices may be used. A smart computing device may be one of the appropriate systems for storing data and other private/sensitive information.

Figure 2:
FIG. 2 illustrates an exemplary representation of proposed Near-RT RIC system/server for inter radio intelligent controller communication, in accordance with an embodiment of the present disclosure.
Figure 2:
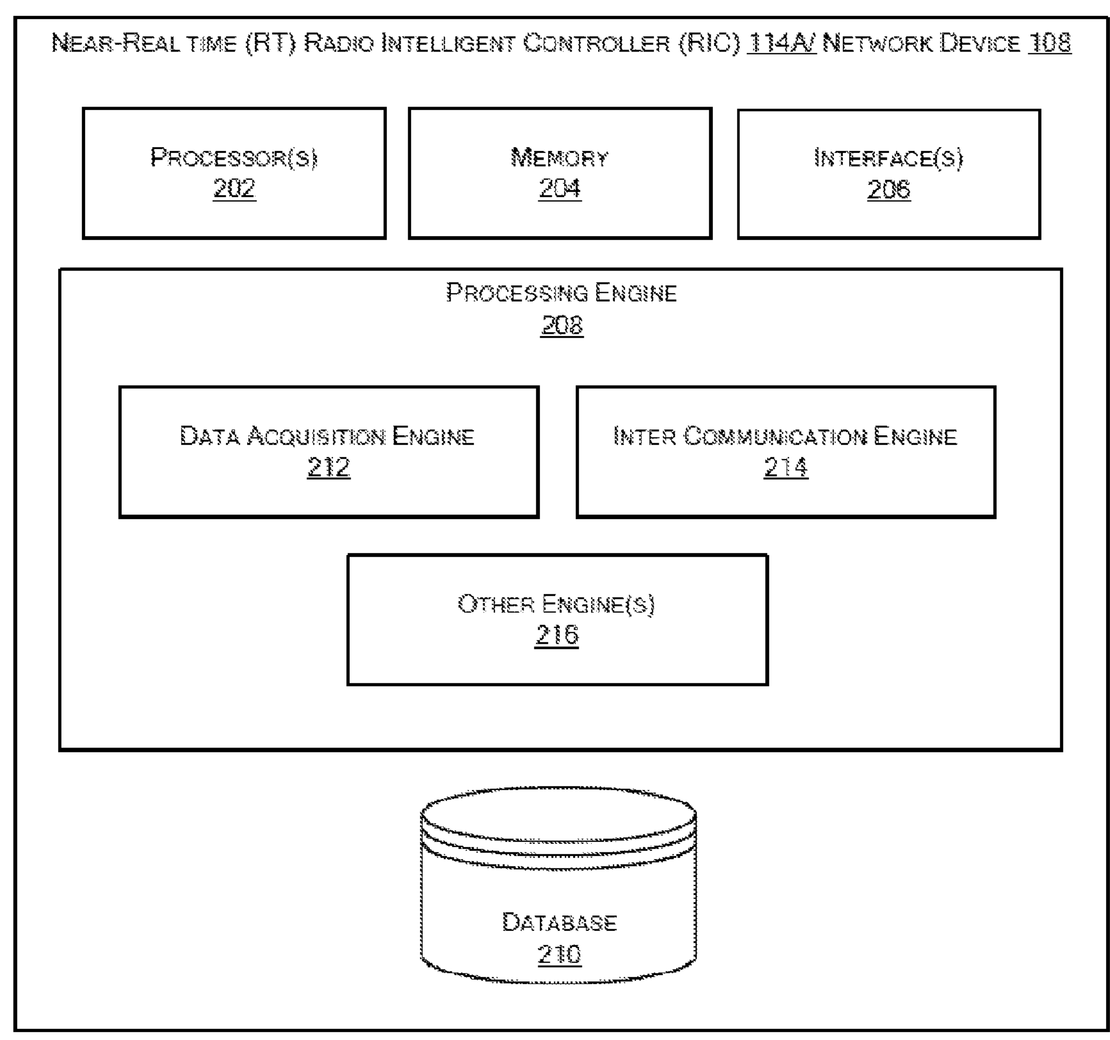

FIG. 2 illustrates an exemplary representation of proposed network device (108)/Near-RT RIC system for inter Radio Intelligent Controller (RIC) communication, using information request response procedure, in accordance with an embodiment of the present disclosure.

In an aspect, the Near-RT RIC (114A)/the network device (108) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the Near-RT RIC (114A)/the network device (108). The memory (204) may store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the Near-RT RIC (114A)/the network device (108) may include an interface(s) (206). The interface (s) (206) may also provide a communication pathway for one or more components of the Near-RT RIC (114A)/the network device (108). Examples of such components may include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the Near-RT RIC (114A)/the network device (108) may comprise the machine-readable storage medium storing the instructions and the processing resource to execute the instructions, or the machine-readable storage medium may be separate but accessible to the Near-RT RIC (114A)/the network device (108) and the processing resource. In other examples, the processing engine(s) (208) may be implemented by electronic circuitry. Further, the Near-RT RIC (114A)/the network device (108) may include Machine Learning (ML) modules.

The processing engine (208) may include one or more engines selected from any of a data acquisition engine (212), information request/response engine (inter-communication engine) (214), and other engines (216). The data acquisition engine (212), inter communication engine (214) may include Machine Learning (ML) modules. The processing engine (208) may further edge based micro service event processing but not limited to the like.

Figure 3A:
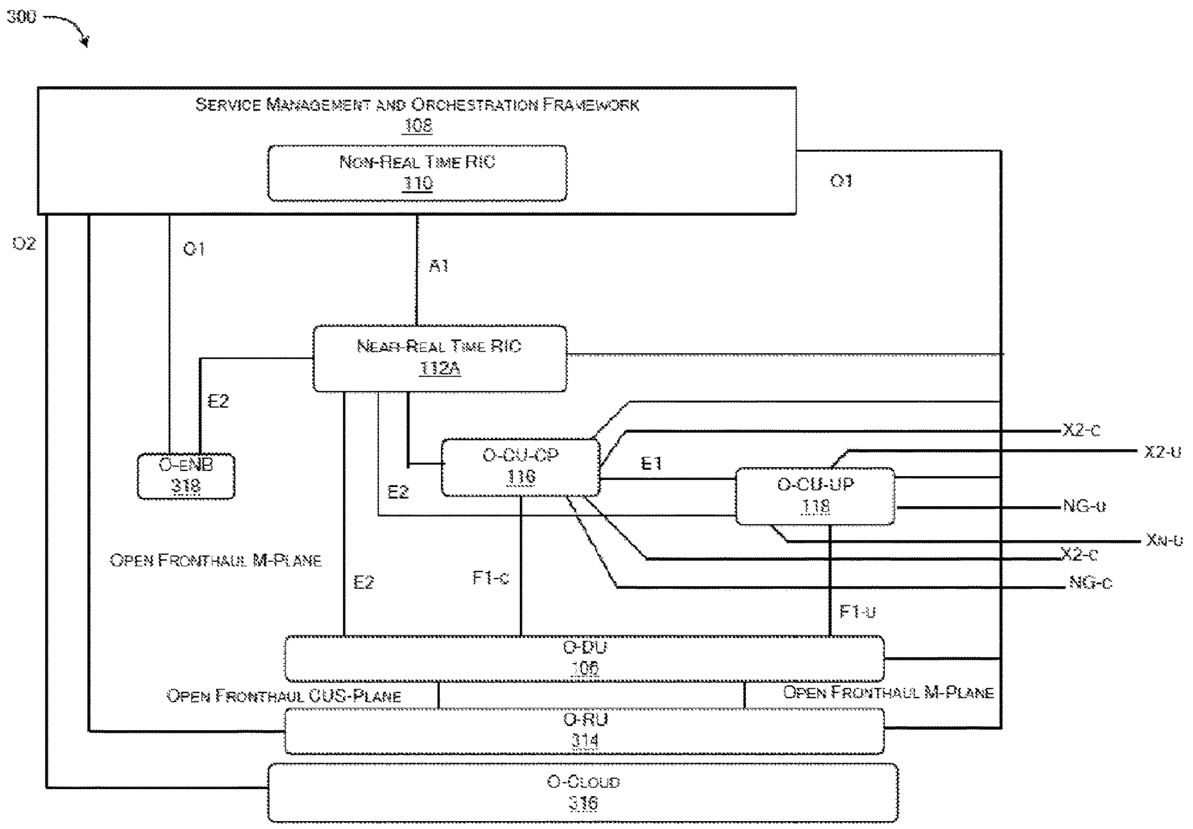
FIG. 3A illustrates an exemplary block diagram representation of a system architecture, in accordance with an embodiment of the present disclosure.

FIG. 3A illustrates an exemplary block diagram representation of a system architecture (300), in accordance with an embodiment of the present disclosure.

The system architecture (300) is an O-RAN architecture. The rApps (112) may have an interface where external information can be fed to the operator network. The Near-RT RIC (306) may be a logical function that enables near-real-time control and optimization of RAN elements and resources via fine-grained data collection and actions over E2 interface, as shown in FIG. 3A. The Near-RT RIC (306) may include Artificial Intelligence (AI)/Machine Learning (ML) workflow including model training, inference and updates which are handled by the xApps (114B).

Further, the Non-RT RIC (304) may include a logical function within Service Management and Orchestration system (SMO) (302), that may drive the content carried across the A1 interface, as shown in FIG. 3A. The Non-RT RIC (304) may include a Non-RT RIC Framework and the Non-RT RIC Applications such as the rApps (112). Furthermore, the Non-RT RIC framework, may function internal to the SMO system (302), that logically terminates the A1 interface to the Near-RT RIC (306) and may expose set of internal SMO services needed for their runtime processing, to the rApps (112), via a R1 interface. The Non-RT RIC framework may function within the Non-RT RIC (304) and may provide AI/ML workflow including model training, inference and updates needed for rApps (312).

Further, O1 interface from the O-RAN components may terminate at the SMO system (302). The O-CU-CP (308) may be a logical node hosting the RRC and the control plane part of the PDCP protocol. Further, an O-CU-UP (310) may be a logical node hosting the user plane part of the PDCP protocol and the SDAP protocol. An O-DU (312) may be a logical node hosting Radio Link Control (RLC)/Medium Access Control (MAC)/High-Physical (PHY) layers based on a lower layer functional split. E2 node may be a logical node terminating E2 interface. Further, a O-RAN nodes may be terminating at E2 interface that are, for NR access O-CU-CP (308), O-CU-UP (310), O-DU (312) or any combination, and for E-UTRA access such as O-eNB (318). The Non-RT RIC applications such as rApps (112) may be modular applications that leverage the functionality exposed via the R1 interface of the Non-RT RIC framework, to provide added value services relative to RAN operation. The added value services relative to RAN operation includes, but not limited to, driving the A1 interface, recommending values and actions that may be subsequently applied over the O1/O2 interface and generating "enrichment information" for the use of other rApps (112), and the like. The rApps (112) may function within the Non-RT RIC (304) that enables non-real-time control and optimization of RAN elements and resources and policy-based guidance to the applications/features in Near-RT RIC (306). Further, the Near-RT RIC applications such as x-App (114B) may run on the Near-RT RIC (306). Such application may be likely to consist of one or more microservices and at the point of on-boarding may identify which data it consumes and which data it provides. The application is independent of the Near-RT RIC (306) and may be provided by any third party. The E2 enables a direct association between the xApps (114B) and the RAN functionality.

Further, an O-Cloud (316) may be a cloud computing platform which includes a collection of physical infrastructure nodes that meet O-RAN requirements to host the relevant O-RAN functions of Near-RT RIC (405), O-CU-CP (308), O-CU-UP (310), and O-DU (312), the supporting software components (such as Operating System, Virtual Machine Monitor, Container Runtime, etc.) and the appropriate management and orchestration functions. In addition, O1 interface may be between SMO framework and O-RAN managed elements, for operation and management, by which may be Fault, Configuration, Accounting, Performance, Security, (FCAPS) management, Physical Network Function (PNF) software management, file management may be achieved. Further, O2 interface may be between SMO framework and the O-Cloud (316) for supporting O-RAN virtual network functions. Furthermore, A1 interface between the Non-RT RIC (304) and the Near-RT RIC (306). The purpose of the A1 interface may be to enable the non-RT RIC function to provide policy-based guidance, ML model management and enrichment information to the Near-RT RIC function so that the RAN can optimize e.g., Radio Resource Management (RRM) under certain conditions. Thereafter, the E2 interface may be to connect the Near-RT RIC (406) and one or more O-CU-CPs (308), one or more O-CU-Ups (310), and one or more O-DUs (312). The R1 interface may be between the rApps (112) and the non-RT RIC framework.

Although not shown in the FIG. 3A, the O-eNB (318) may not support O-DU (312) and O-RU (314) functions with an Open Fronthaul interface between them. The management side includes SMO framework containing a Non-RT-RIC function. The O-Cloud (316), on the other hand, is a cloud computing platform comprising a collection of physical infrastructure nodes that meet O-RAN requirements to host the relevant O-RAN functions (such as Near-RT RIC (306), O-CU-CP (308), O-CU-UP (310) and O-DU (312) etc.), the supporting software components (such as Operating System, Virtual Machine Monitor, Container Runtime, etc.) and the appropriate management and orchestration functions. As shown in the FIG. 3A, the O-RU (314) terminates the Open Fronthaul M-Plane interface towards the O-DU (314) and the SMO (302). The O-eNB (318) enables communication with one or more User Equipment (420-1, 420-2, . . . , 420-N) (individually referred as UE (420) and collectively referred as UEs (420)) and the UE (420) may be communicatively coupled to O-CU-CP (308), O-CU-UP (310) and O-DU (312) etc.

The system architecture (300) may not provide any provision for the interface between any two Near-RT RICs and may not provide any mechanisms to realize the Inter Near-RT RIC communications in the O-RAN architecture. Embodiments herein provides functional split mechanism between different entities in a O-RAN architecture and the associated data/control flow mechanisms.

Figure 3B:
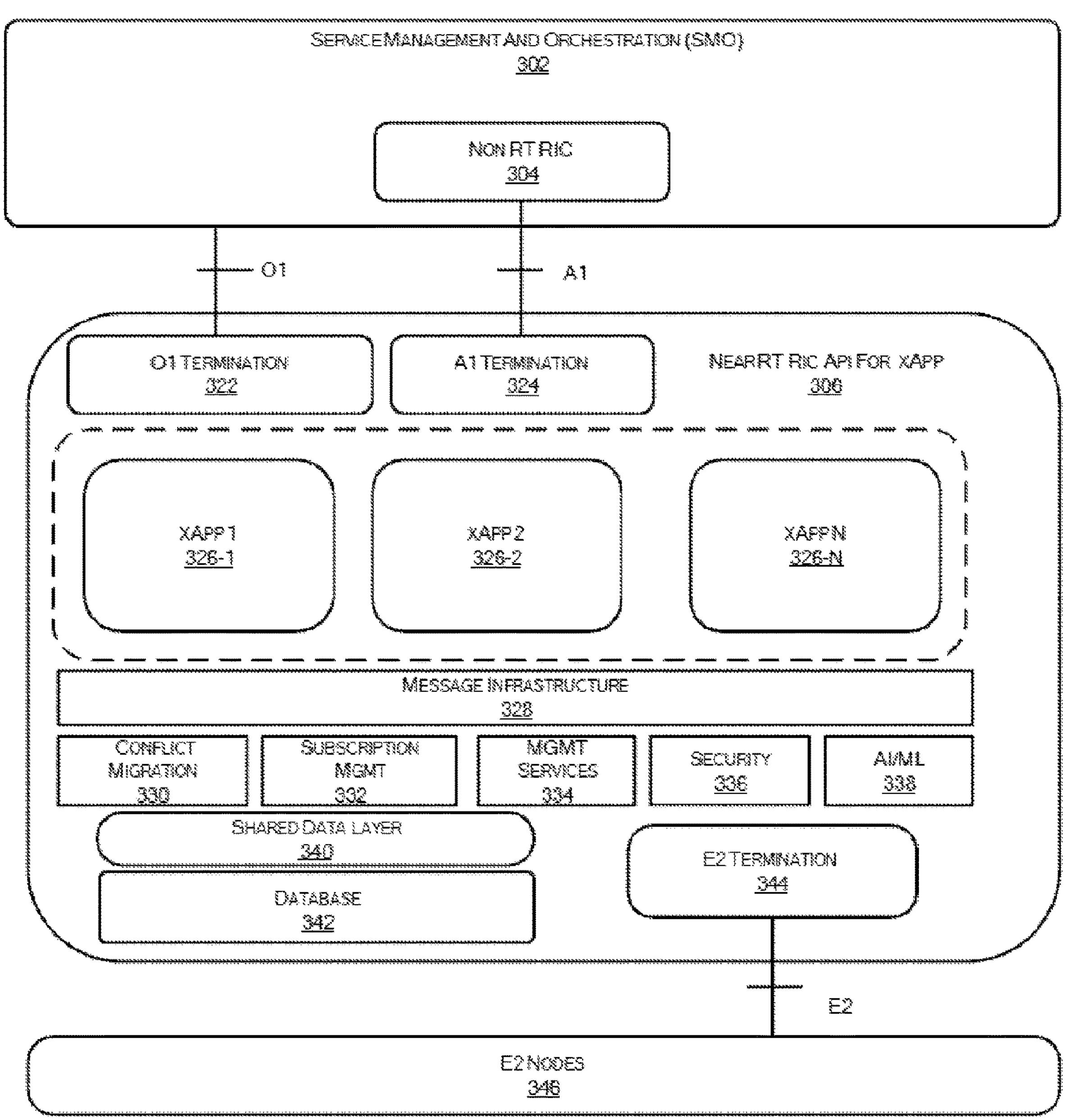
FIG. 3B illustrates an exemplary block diagram representation of a Near Real-Time Radio Intelligent Controller (Near-RT RIC) architecture associated with the O-RAN, in accordance with an embodiment of the present disclosure.

FIG. 3B illustrates an exemplary block diagram representation of a Near Real-Time Radio Intelligent Controller (Near-RT RIC) architecture (306) associated with the O-RAN, in accordance with an embodiment of the present disclosure.

The Near-RT RIC system (306) may be further subdivided into different sub systems as shown in the FIG. 3B. The xAPPs (326-1, 326-2, . . . , 326-N) (individually referred as xApp (326) and collectively referred as xApps (326)) within the Near-RT RIC (306). The Near-RT RIC (306) functions may be determined by the xAPPs (326) hosted within the Near-RT RIC (306). Based on the data received from E2 Node and the AI/ML algorithms running in xAPPs (326), xAPPs (326) shall control the behaviour of the E2 Node. The SMO (302) may include Non-RT RIC (304), which may connect via O1 and A1 interface to the Near-RT RIC (306). The O1 may terminate (322) and the A1 (324) may terminate (324), as shown in FIG. 3B. Further, Near-RT RIC system (306) may include messaging infrastructure (328), conflict mitigation (330), subscription management (332), management service (334), security (336), AI/ML support module (338), shared data layer (340), and database (342). The Near-RT RIC system (306) may connect to E2 nodes at terminate (344) as shown in FIG. 3B.

The E2 interface has defined a standard set of methods for communication between Near-RT RIC (306) and E2 Node (346) over E2 interface. The Near-RT RIC (306), a Near-real-time RAN Intelligent Controller, may be a logical function that enables near-real-time control and optimization of RAN elements and resources via fine-grained (e.g., User Equipment (UE) basis, cell basis) data collection and actions over E2 interface. From the O-RAN architecture as shown in FIG. 3A, it is very evident that, there are clear cut interfaces defined for Near-RT RIC (306) to interact with E2 nodes, non-RT RIC (306) and management entity through E2, A1 and O1 interfaces respectively. From the HetNet deployment point of view, as the number of E2 nodes increases with multi-vendor E2 node portfolios, the multi-vendor Near-RT RIC may also increase to support the huge E2 nodes. Each of these deployed Near-RT RIC entities may act as an independent node. For instance, there may be no interaction possible between any two Near-RT RIC entities. This limitation can pose some drawbacks in the network deployment and operations.

Figure 4A:
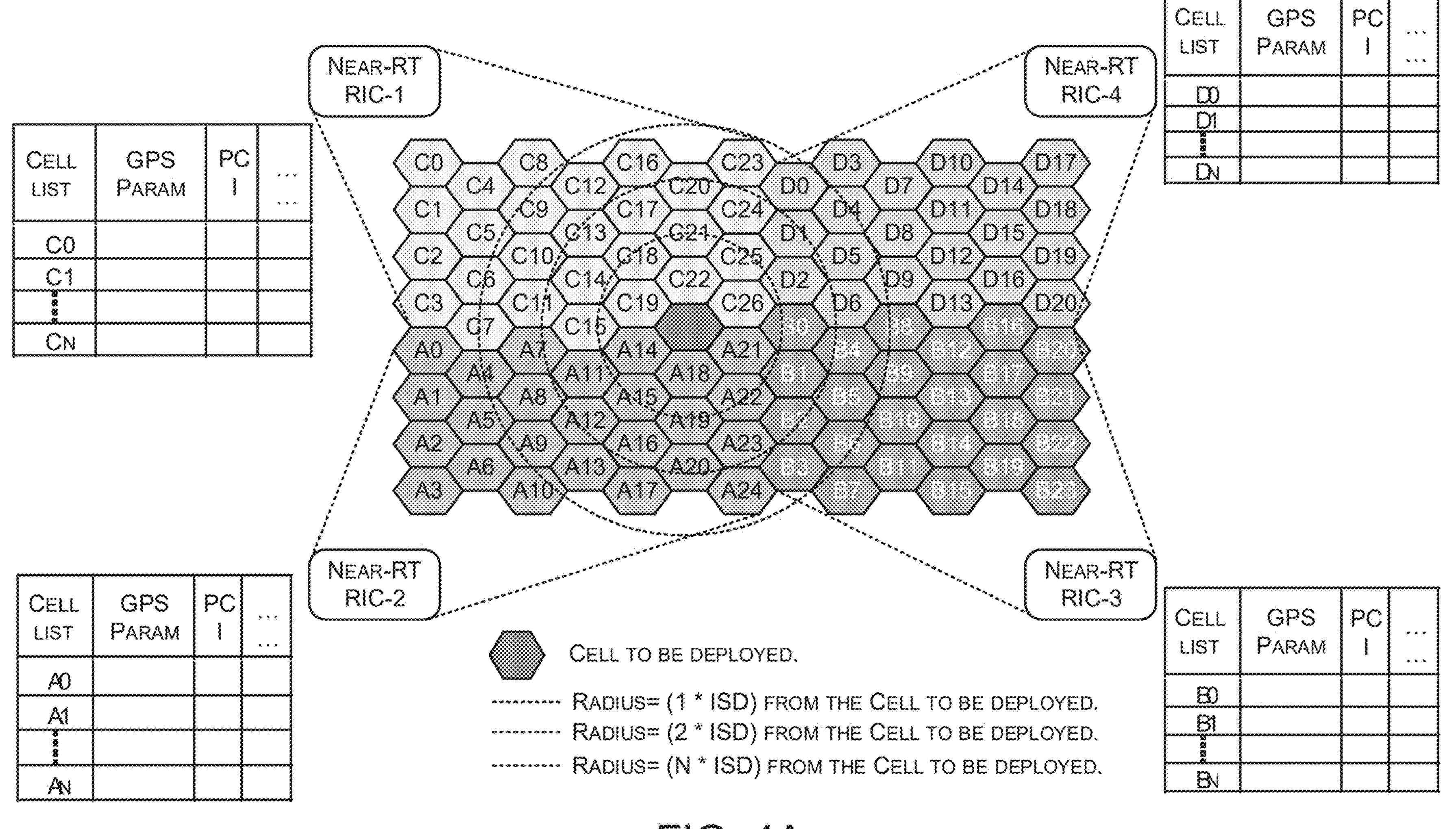
FIG. 4A illustrates a schematic diagram representation of Near-RT RIC deployment without inter Near-RT RIC communication, in accordance with an embodiment of the present disclosure.

FIG. 4A illustrates a schematic diagram representation of Near-RT RIC deployment without inter Near-RT RIC (306) communication, in accordance with an embodiment of the present disclosure.

The Near-RT RIC-1 may be supporting cells C0 to Cn [n=26 here in FIG. 4A] with one or more O-CUs/O-DUs. Hence, the O-RAN may create a cell list context table with entries for each of these cells. Similarly, Near-RT RIC-2, Near-RT RIC-3 and Near-RT RIC-4 are supporting cells A0 to An [n=24 in FIG. 4A], B0 to Bn [n=23 in FIG. 4A] and D0 to Dn [n=20 in FIG. 4A], respectively. When a new cell needs to be deployed, which is shown as dark coloured hexagon in FIG. 4A, and may also be planned to be associated with Near-RT RIC-1, then a Physical Cell ID (PCI) algorithm in PCI xApp, may need to allocate an initial PCI to the cell for respective operation. As an example, PCI xApp may obtain cell's GPS coordinates including altitude, Inter-Site Distance (ISD), number of ISD (N), and so on, as inputs to derive the initial PCI for the cell to be deployed. The algorithm running in PCI xApp may first list all the cells already deployed within the sphere of radius (N*ISD) from the location of the new cell being deployed and identify the PCIs allocated for those cells from the cell list table maintained at Near-RT RIC-1. According to FIG. 4A, when N=1, the PCI xApp may identify C19, C22 and C26 as the cells already deployed and checks the PCIs allocated to the cells. The PCI xApp may derive a new PCI, which may be mutually exclusive from the PCIs allocated for C19, C22 and C26 cells and may assign to the new cell being deployed. However, this allocated PCI may cause PCI collisions immediately. From the FIG. 4A, it may be very evident that, the radius (1*ISD) from the new cell to be deployed includes C19, C22, C26, A14, A18 and A21 as possible direct neighbours. However, the Near-RT RIC-1 may only have entries for C19, C22 and C26 and based on the limited information, the PCI xApp of the C19, C22 and C26 may allocate a PCI, which might have already allocated for A14, A18 or A21 cells by PCI xApp in other Near-RT RIC-x. This may cause the PCI collisions and hence degrades the network performance severely. Even if considering N=2 case as illustrated in FIG. 4B, due to this limitation, there may be a very high chance for newly allocated PCI to create PCI collisions or confusions and hence degrading the network performance.

Figure 4B:
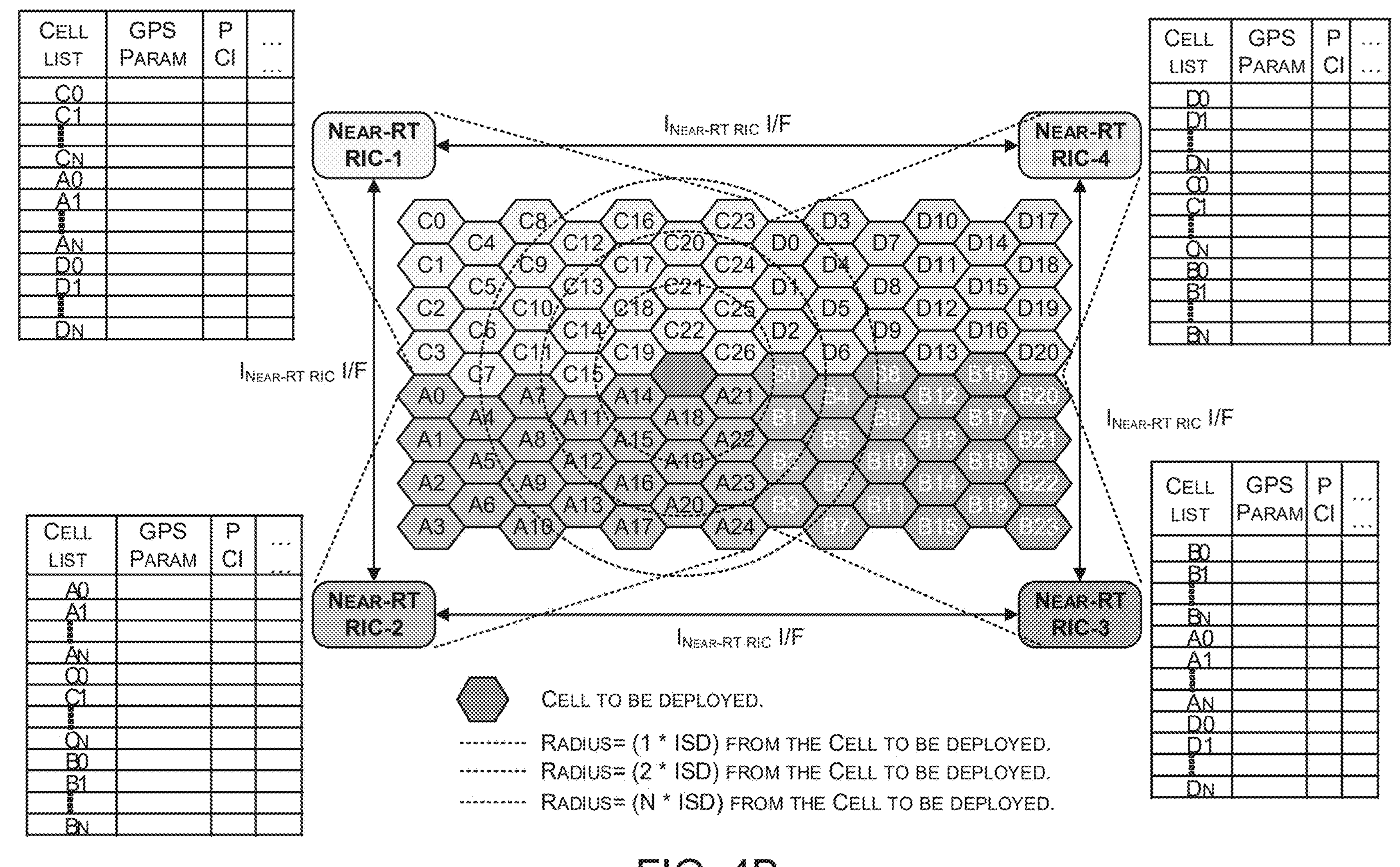
FIG. 4B illustrates a schematic diagram representation of Near-RT RIC deployment with inter Near-RT RIC communication, in accordance with an embodiment of the present disclosure.

Further, FIG. 4B illustrates a schematic diagram representation of Near-RT RIC deployment with inter Near-RT RIC (306) communication, in accordance with an embodiment of the present disclosure. FIG. 4B illustrates a deployment scenario where there is a logical interface INear-RT RIC between the two visible Near-RT RICs. Here, the Near-RT RIC-1 may be connected with Near-RT RIC-2 and RIC-4 through the INear-RT RIC interface. Similarly, other Near-RT RICs may be connected with other visible RICs via INear-RT RIC interface. As a result, the Near-RT RIC-1 may obtain the cells supported by the other RICs, here, RIC-2 and RIC-4 either during the INear-RT RIC link establishment or during the links configuration update procedures. Consequently, the Near-RT RIC-1's table may include the cells C0 to Cn (n=26), A0 to An (n=24) and D0 to Dn (n=20), as illustrated in FIG. 4B. The PCI xApp running in Near-RT RIC-1 may have the visibility of all the cells and consequently the chosen new PCI will be more mutually exclusive and free from PCI collisions and confusions. In case, all the deployed Near-RT RICs may be mutually connected (star fashion), then the PCIs allocated will be even more fool proof from PCI collisions and Confusions, as the table includes all possible supported cells belonging each of the interconnected Near-RT RICs. From this example, it may be evident that, there is a need for the interface between Near-RT RICs.

Figure 4C:
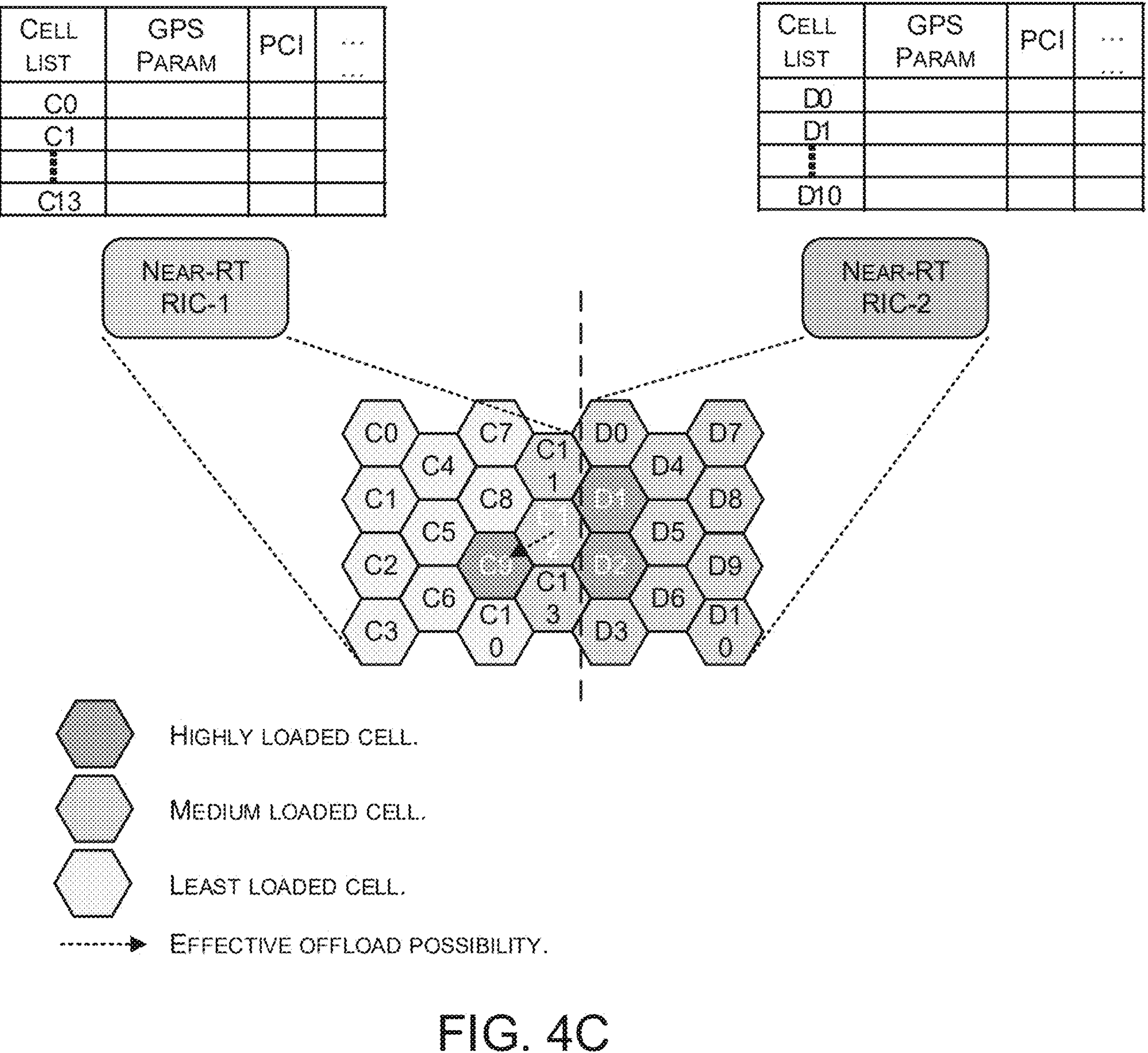
FIG. 4C illustrates a schematic diagram representation of effective offload possibility without inter Near-RT RIC communication, in accordance with an embodiment of the present disclosure.

FIG. 4C illustrates a schematic diagram representation of effective offload possibility without inter Near-RT RIC communication, in accordance with an embodiment of the present disclosure. Considering another example to understand the need for the Near-RT RIC (306) to RIC interface. FIG. 4C illustrates an effective offload possibility without Inter Near-RT RIC communications. In this scenario, Near-RT RIC-1 may support cells C0 to Cn (n=13) and Near-RT RIC-2 may support cells D0 to Dn(n=10). A Mobility Load Balancing (MLB) xApp may be running in Near-RT RIC-1 may detect that Cell C12 is highly loaded, Cells C8, C11 and C13 are medium loaded and Cell C9 is least loaded. The MLB xApp may decide to reduce the load in C12 and based on its limited visibility, the MLB xApp may identify only cell C9 as the only offload target cell. Based on this decision, the MLB xApp may trigger the forced handovers for those UEs, which may be closer towards the neighbour cell C9. Because of these limitations, the load of the cell C12 may or may not get reduced effectively, as the number of possible offload targets are very less, due to insufficient visibility of the neighbour cells, as there is no interface between Near-RT RICs. The MLB xApp in Near-RT RIC-1 may also choose Cell D1 and D2 as additional offload targets, which are supported as part of Near-RT RIC-2, however, the MLB xApp may utilize E2 nodes to use the associated X2/Xn interfaces for the Handover trigger to reduce the load. The real-time analytics data available at Near-RT RIC-2, may aid in effective offload and also aid in avoiding the loading of any cell in particular, and may not possible to utilize by Near-RT RIC-1, as there is no direct interface between the two RICs. Consequently, the high load of the cell C12 may persist for long and other cells may also enter into high load state sooner and may be frequent. This results in degradation of network performance, sub-optimal utilization of network resources, degraded end-to-end Quality of Experience (QoE).

Figure 4D:
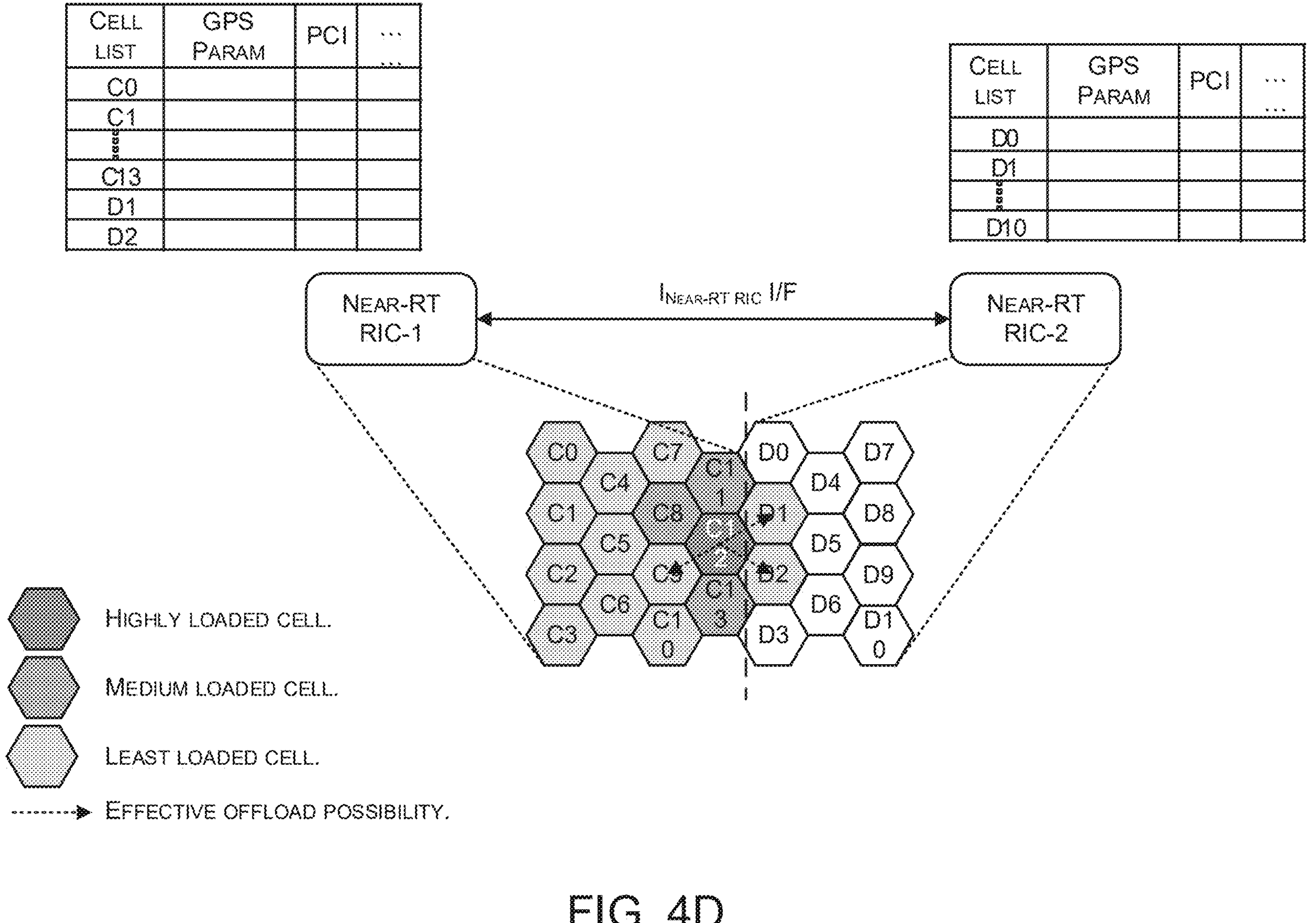
FIG. 4D illustrates a schematic diagram representation of effective offload possibility with inter Near-RT RIC communication, in accordance with an embodiment of the present disclosure.

FIG. 4D illustrates a schematic diagram representation of effective offload possibility with inter Near-RT RIC communication, in accordance with an embodiment of the present disclosure. FIG. 4D illustrates an effective offload possibility when the inter Near-RT RIC communications is supported. In this scenario, the Near-RT RIC-1 may have an INear-RT RIC link established with Near-RT RIC-2. As a result, the cell info table of the Near-RT RIC has all the cells supported by both RIC-1 and RIC-2. Since, the RIC-1 may have access with the cells supported by RIC-2, it can request RIC-2 to provide updates on the load, measurements, real-time data analytics, and so on, specific to cells D1 and D2 and also it can get those details of other cells as well. So, as a reactive measure, this time MLB xApp running at RIC-1 can choose cells C9, D1 and D2 for the offload from the cell C12. So, the effectiveness of offload among three cells will be much better than to the single cell C9, as per the earlier scenario. Better than reactive measures, it may be always better to go for predictive measures. Since, both RICs are in communication, both RICs can exchange the analytics data and can predict the load situations on probable candidate cells and take advanced measures to avoid such loading among those candidate cells. Advanced measures can be a traffic steering to appropriate cells of same or multi-RAT for the entire predicted time duration, including Traffic switching and traffic splitting. These advanced measures aids in providing and sustaining good end-to-end QoE.

Similarly, the new interface is going to get benefits for other SON and Radio Resource Management (RRM) functions. From these, it may be evident that, there may be an interface for communication between different Near-RT RICs. In an embodiment, the INear-RT RIC interface may be defined as a logical interface between any two Near-RT RIC entities and the associated procedures can be realized via an advancement in the existing O1 interface through the management entity at SMO. Here, the existing O1 interface may be updated by an advancement technique needed for INear-RT RIC interface. The advancement technique may be a set up request message. In an embodiment of the present invention, the set up request message may comprise of but not limited to an IP Address, a source allocation ID, a destination allocation ID, details of set of E2 nodes of a source RIC.

Figure 5A:
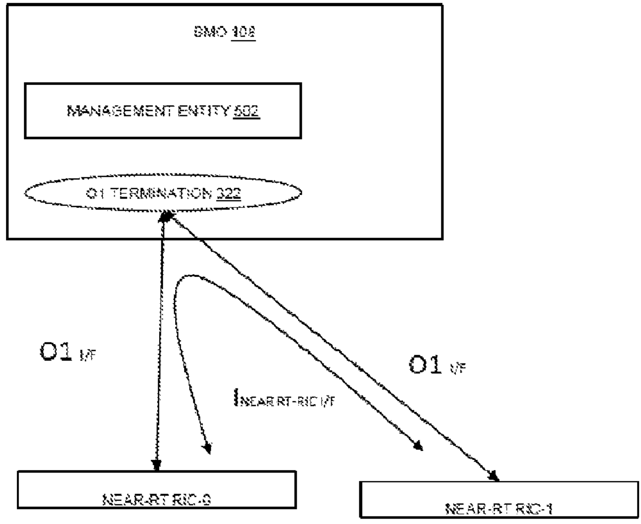
FIG. 5A illustrates an exemplary block diagram representation of architecture with INear-RT RICI/F realized O1 interface, in accordance with an embodiment of the present disclosure.

FIG. 5A illustrates an exemplary block diagram representation of architecture with INear-RT RIC I/F realized O1 interface, in accordance with an embodiment of the present disclosure. When the Near-RT RIC-0 may send any message destined for Near-RT RIC-1 to the SMO (108) via O1 interface, the O1 termination point (322) at the SMO (108) may be routing the received message to the target Near-RT RIC-1, again via O1 interface. When the Near-RT RIC-1 sends a response back to Near-RT RIC-0 via the O1 interface, the O1 termination point (322) at the SMO (108) may be routing back the received message towards Near-RT RIC-0, again via the O1 interface. Similarly, both Near-RT RICs start communicating with each other.

Figure 5B:
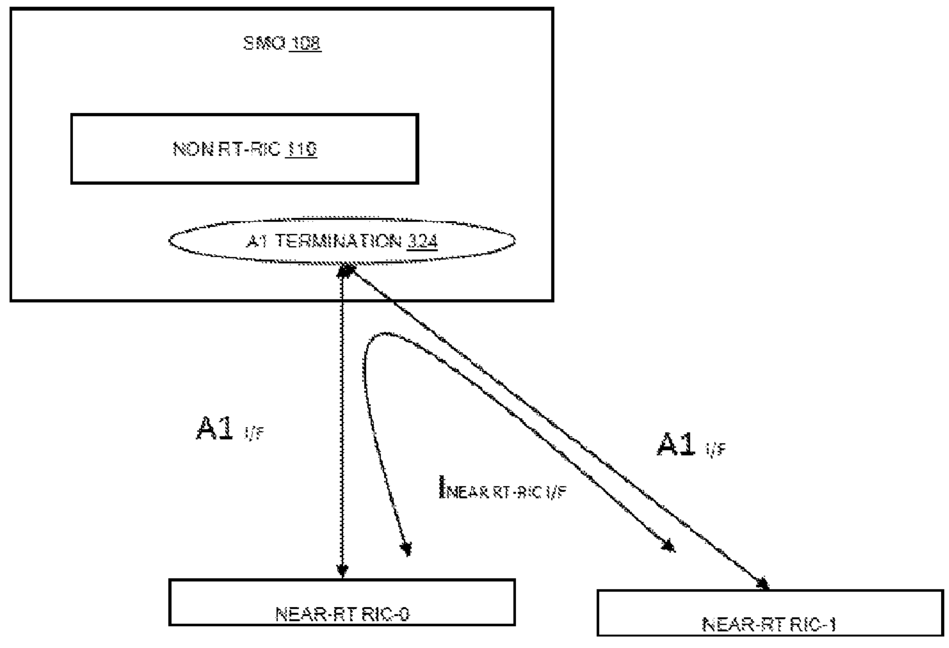
FIG. 5B illustrates an exemplary block diagram representation of architecture with INear-RT RICI/F realized A1 interface, in accordance with an embodiment of the present disclosure.

FIG. 5B illustrates an exemplary block diagram representation of architecture with INear-RT RIC I/F realized A1 interface, in accordance with an embodiment of the present disclosure. The INear-RT RIC interface may be defined as a logical interface between any two Near-RT RIC entities and the associated procedures can be realized via the existing A1 interface through the Non-RT RIC (110) at SMO (108). Here, the existing A1 interface may be updated with new set of procedures needed for INear-RT RIC interface. When the Near-RT RIC-0 sends any message destined for Near-RT RIC-1 to Non-RT RIC at SMO (108) via A1 interface, the A1 termination point (324) at the SMO (108) may be routing the received message to the target Near-RT RIC-1, again via A1 interface. When the Near-RT RIC-1 sends a response back to Near-RT RIC-0 via the A1 interface, the A1 termination point (324) at the SMO (108) may be routing back the received message towards Near-RT RIC-0, again via the A1 interface. Similarly, both Near-RT RICs start communicating with each other.

Figure 5C:
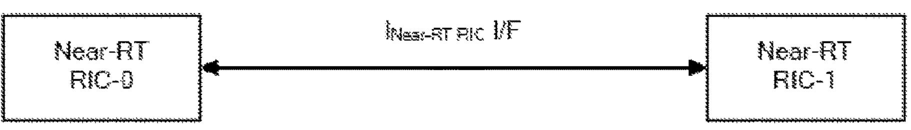
FIG. 5C illustrates an exemplary block diagram representation of architecture with direct INear-RT RICI/F between Near RT-RICs, in accordance with an embodiment of the present disclosure.

FIG. 5C illustrates an exemplary block diagram representation of architecture with direct INear-RT RIC I/F between Near RT-RICs, in accordance with an embodiment of the present disclosure. The INear-RT RIC interface may be defined as a logical interface between any two Near-RT RIC entities and the associated procedures can be realized via the direct physical interface. In an embodiment, the Near RT-RIC may send a direct setup request message to the Near RIC-1. Here, both Near-RT RIC-0 and RIC-1 can exchange messages directly and act accordingly.

Figure 5D:
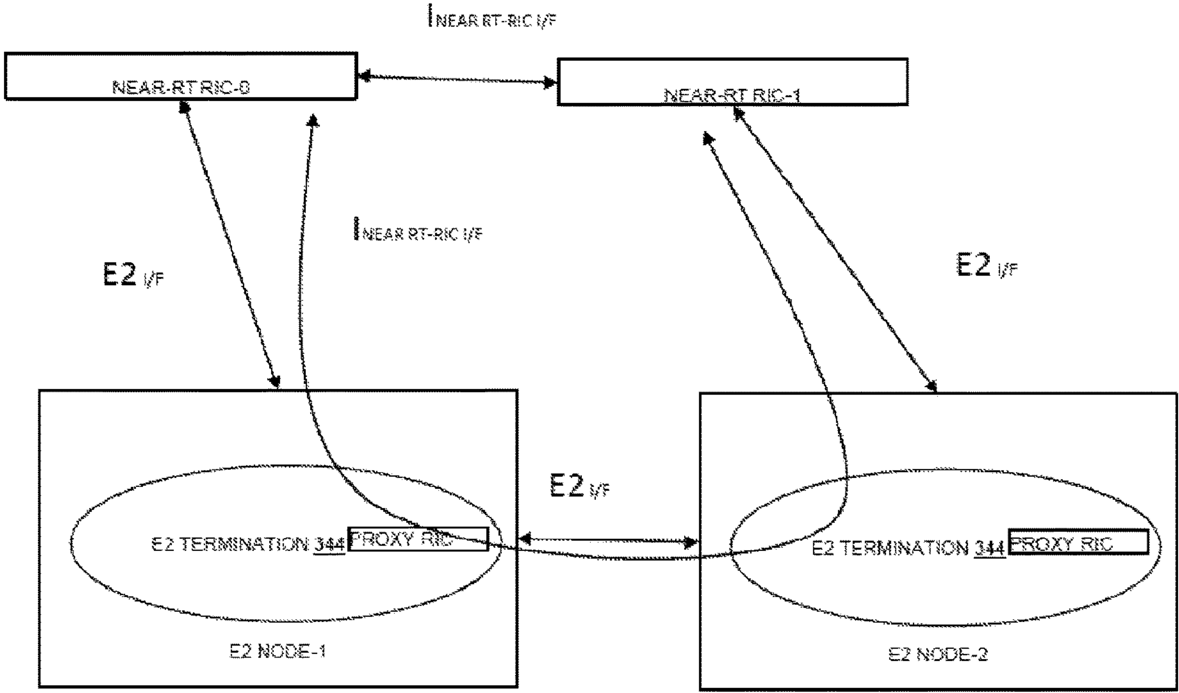
FIG. 5D illustrates an exemplary block diagram representation of architecture with INear-RT RICI/F between Near RT-RICs via E2 nodes, in accordance with an embodiment of the present disclosure.

FIG. 5D illustrates an exemplary block diagram representation of architecture with INear-RT RIC I/F between Near RT-RICs via E2 nodes, in accordance with an embodiment of the present disclosure. The INear-RT RIC interface may be defined as a logical interface between any two Near-RT RIC entities and the associated procedures can be realized via the existing E2 interface through the E2 nodes. Here, the existing E2 interface may be updated with the advancement technique (setup request message) needed for INear-RT RIC interface. The E2 termination point (344) may be supported with proxy RIC functionality for the procedures associated with the INear-RT RIC interface. The proxy RIC functionality within E2 termination point (344) can trigger the establishment of the E2 link with the associated neighbour cell. Once the E2 link is successfully established, both E2 nodes can start exchanging the messages associated with the INear-RT RIC interface. When the Near-RT RIC-0 sends any message destined for Near-RT RIC-1 to E2 node via E2 interface, the E2 termination point at the E2 node may forward the message to the associated peer E2 node via the established E2 interface, which in turn will be routing the received message to the target Near-RT RIC-1, again via the respective E2 interface. When the Near-RT RIC-1 sends a response back to Near-RT RIC-0 via the E2 interface, the E2 termination point (344) at the E2 node may forward the message to the associated peer E2 node via the established E2 interface, which in turn will be routing the received message to the Near-RT RIC-0, again via its E2 interface. Similarly, both Near-RT RICs start communicating with each other.

Figure 6A:
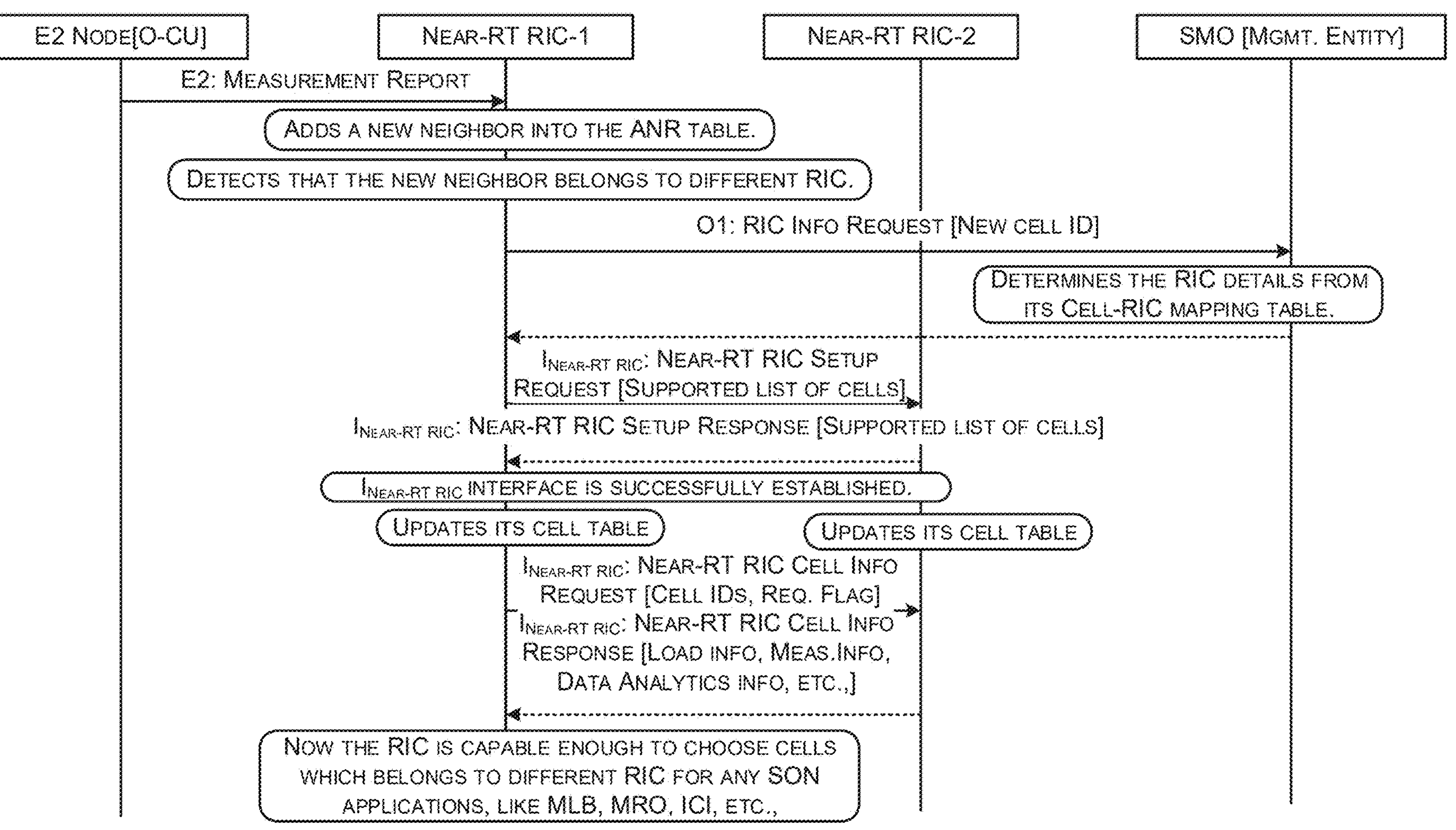
FIG. 6A illustrates an exemplary sequence diagram representation for establishing INear-RT RICI/F link between Near RT-RICs nodes, in accordance with an embodiment of the present disclosure.

FIG. 6A illustrates an exemplary sequence diagram representation for establishing INear-RT RICI/F link between Near RT-RICs nodes, in accordance with an embodiment of the present disclosure.

At step (602-1), the E2 node O-CU, may transmit E2: measurement report to the Near RT-RIC-1. At step (602-2), the Near-RT RIC-1 may add a new neighbour cell in an Automatic Neighbour Relation (ANR) table. At step (602-3), the Near-RT RIC-1 may detect a new neighbour cell in an Automatic Neighbour Relation (ANR) table which may not be supported or registered in the current RIC. At step (602-4), the Near-RT RIC-1 may then find new neighbour cell belongs, which to the RIC in the by sending a O1:RIC information request message to the management entity at SMO (302) via O1 interface. The message may include cell Identity (ID) of the new neighbour cell. At step (602-5), the SMO (302) may search associated cell-RIC mapping table for the cell ID and locate the respective RIC details. At step (602-6), the SMO (302) may respond back with the new neighbour cell's RIC transport layer address by sending O1:RIC information response message to the Near-RT RIC-1. Upon the reception of the Near-RT RIC-2's transport layer address, the Near-RT RIC-1 may initiate a setup procedure to establish an INear-RT RIC interface link with Near-RT RIC-2. At step (602-7), the Near-RT RIC-1 may send a INear-RT RIC: Near-RT RIC setup request message to Near-RT RIC-2 with associated list of supported cells. At step (602-8), the Near-RT RIC-2 may acknowledge the request, and at step (602-11), update supported cell list table with the received list of cells and respond back by sending INear-RT RIC: Near-RT RIC setup response message with supported list of cells. At the reception of the response message, the Near-RT RIC-1, at step (602-10) may update supported cell list table with the received list of cells. At step (602-9), the INear-RT RIC link may be successfully established between the two RICs.

At step (602-12), the Near-RT RIC-1 may send a request by sending INear-RT RIC: Near-RT RIC cell information request message to the Near-RT RIC-2, by providing cell ID or a list of cell IDs, to request load information, measurement information, data analytics information, and so on, by setting appropriate flags, for each requested cell. Upon of this request, at the step (602-13), the Near-RT RIC-2 will register this request, responds back with the latest load information, measurement information, data Analytics information, etc., by sending INear-RT RIC: Near-RT RIC cell information response message to Near-RT RIC-1. At step (602-14), the Near-RT RIC-1 may have all the data necessary for taking decisions for SON, on the cells which belongs to a different RIC.

Figure 6B:
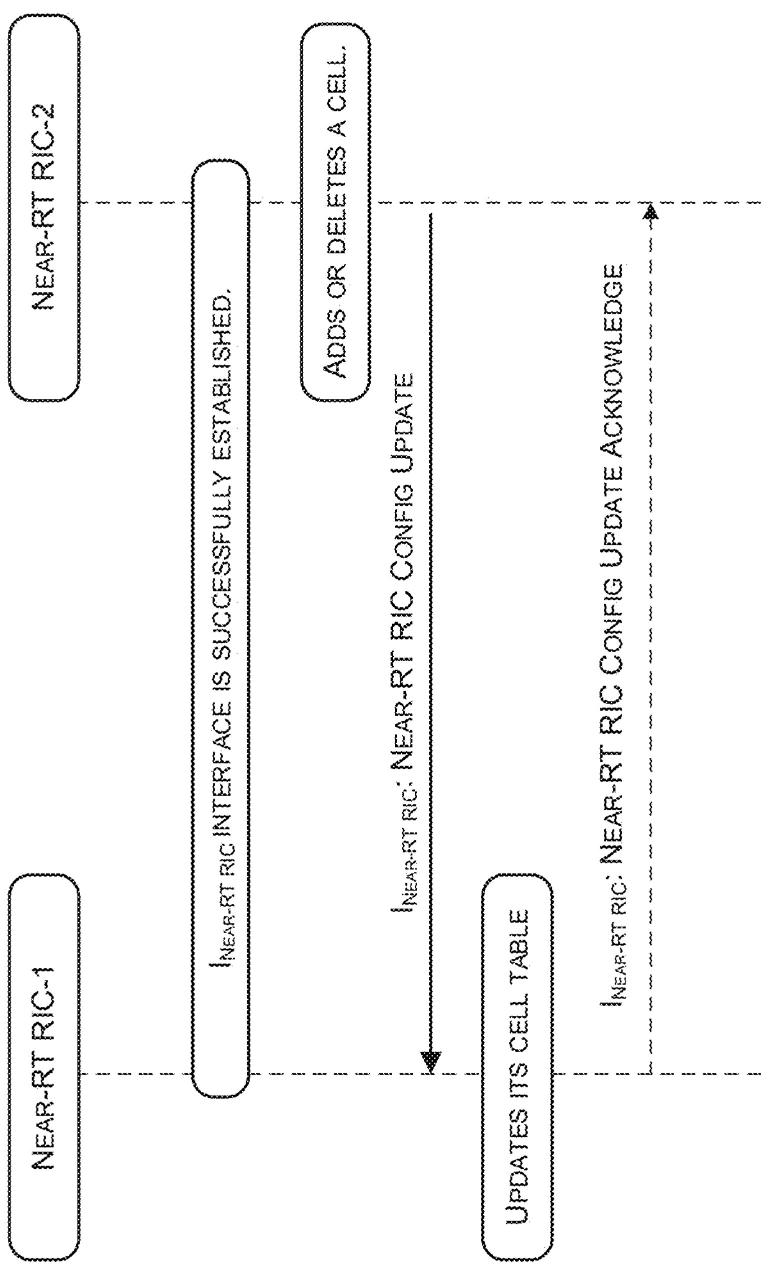
FIG. 6B illustrates an exemplary sequence diagram representation for configuration updates across INear-RT RICI/F, in accordance with an embodiment of the present disclosure.

FIG. 6B illustrates an exemplary sequence diagram representation for configuration updates across INear-RT RICI/F, in accordance with an embodiment of the present disclosure.

At step (604-1), the INear-RT RIC link may be successfully established between the two RICs. At step (604-2), the Near-RT RIC-2 may add or delete and/or modify certain parameters of a cell/cells in a cell or a group of cells. At step (604-3), the Near-RT RIC-2 may indicate, by sending INear- RT RIC: Near-RT RIC config update message to the Near-RT RIC-1. Upon reception, at step (604-4), the Near-RT RIC-1 may update supported cell list table and at step (604-5), respond back by sending INear-RT RIC: Near-RT RIC configuration update acknowledge message to the Near-RT RIC-2.

Figure 6C:
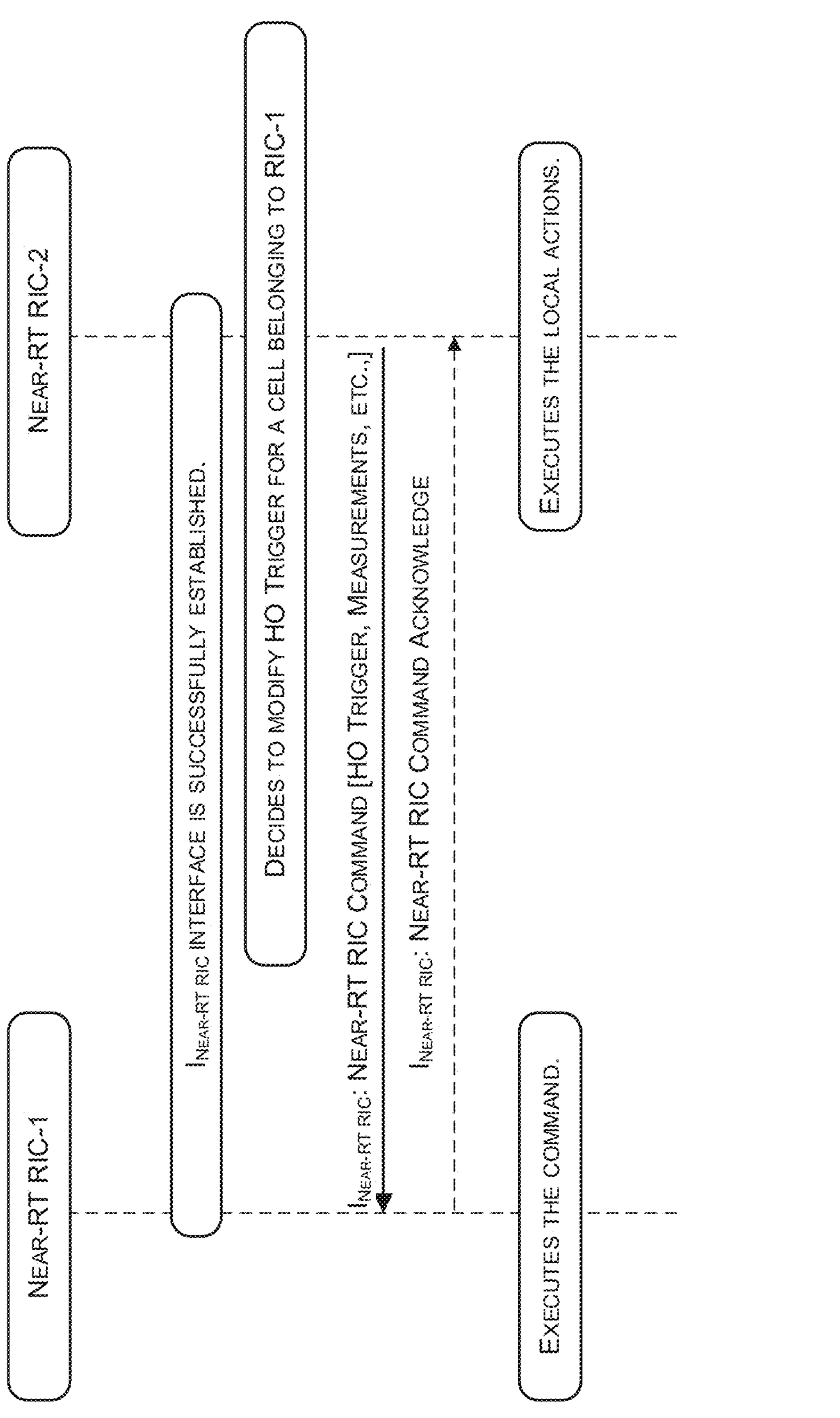
FIG. 6C illustrates an exemplary sequence diagram representation for commands across INear-RT RICI/F, in accordance with an embodiment of the present disclosure.

FIG. 6C illustrates an exemplary sequence diagram representation for commands across INear-RT RICI/F, in accordance with an embodiment of the present disclosure.

At step (606-1), the INear-RT RIC link may be successfully established between the two RICs. At step (606-2), the Near-RT RIC-2 decide to alter Handover (HO) trigger parameter of a cell which belongs to a different RIC. At step (606-3), the Near-RT RIC-2 may send the INear-RT RIC: Near-RT RIC command with needed HO trigger details, related measurements if any to the Near-RT RIC-1. Upon reception, at step (606-4) the Near-RT RIC-1 may acknowledge the command and respond back by sending INear-RT RIC: Near-RT RIC command acknowledge message to the Near-RT RIC-2. At step (606-5), the Near-RT RIC-1 may execute the received commands and at step (606-6) the Near-RT RIC-2 may execute the local actions if anything planned.

Figure 6D:
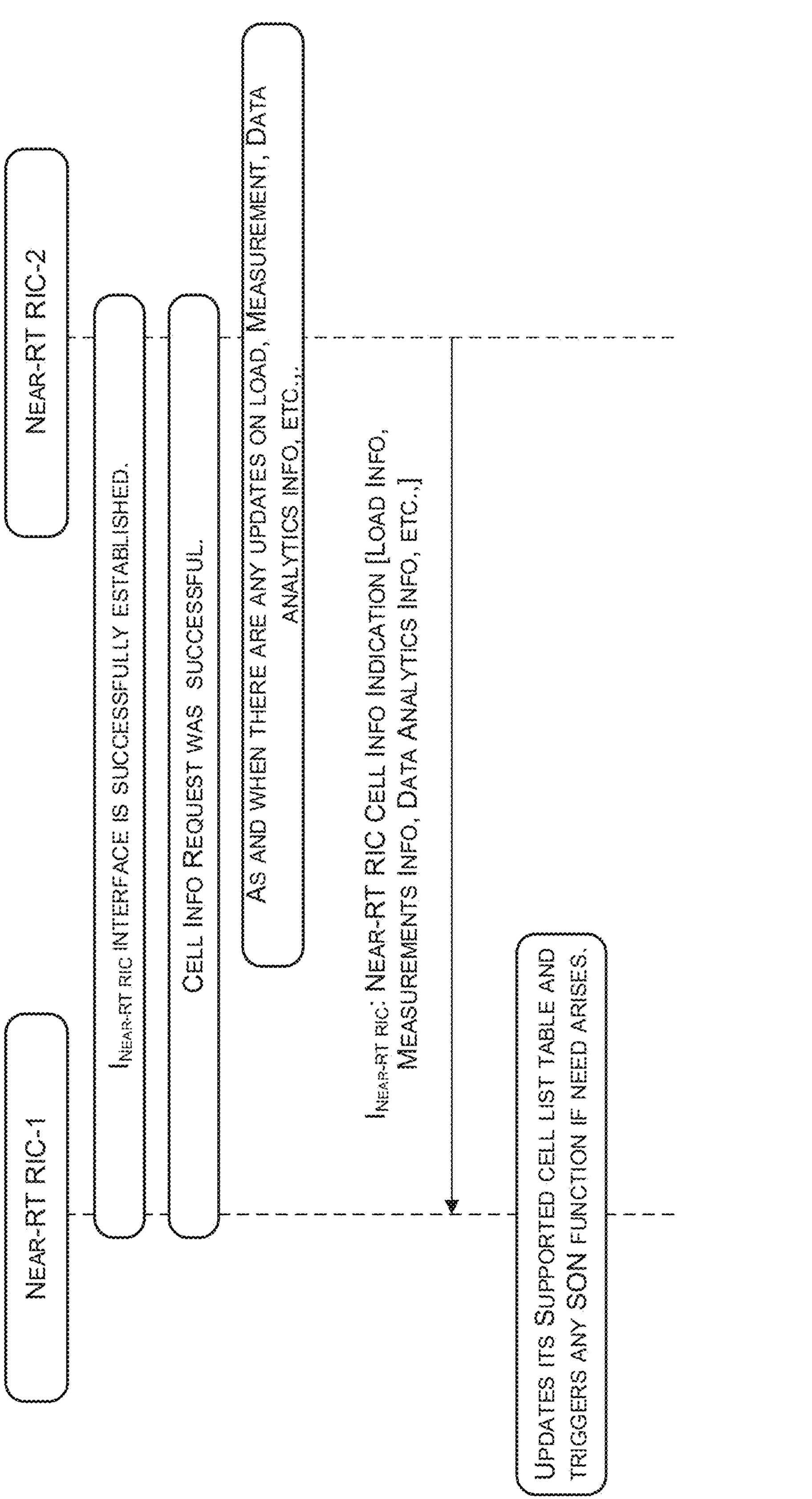
FIG. 6D illustrates an exemplary sequence diagram representation for commands across INear-RT RICI/F, in accordance with an embodiment of the present disclosure.

FIG. 6D illustrates an exemplary sequence diagram representation for commands across INear-RT RICI/F, in accordance with an embodiment of the present disclosure.

At step (608-1), the INear-RT RIC link may be successfully established between the two RICs. At step (608-2), a cell information request may be successful between the two RICs. At step (608-3), the Near RT-RIC-2 may indicate Near RT-RIC information using INear-RT RIC link. At step (608-4), the Near RT-RIC-1 may update load information, measurement information, data analytics information, and so on, at requested Near-RT RIC to the Requestee Near-RT RIC on an INear-RT RIC interface link may be indicated.

Figure 7:
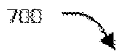
FIG. 7 illustrates an exemplary computer system in which or with which embodiments of the present invention can be utilized, in accordance with embodiments of the present disclosure.
Figure 7:
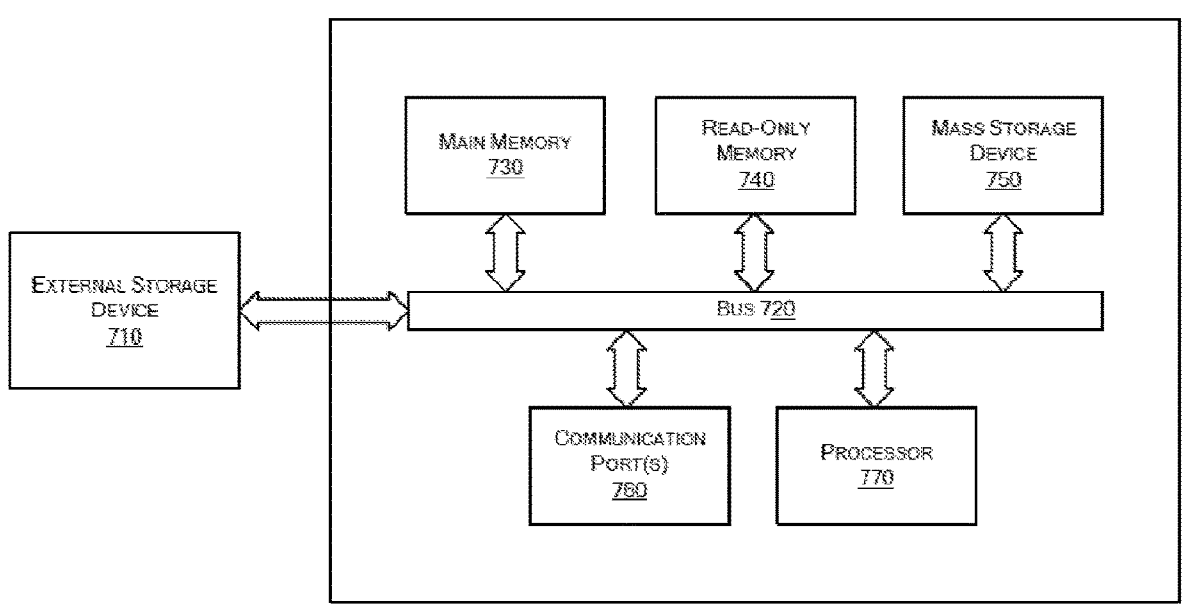

FIG. 7 illustrates an exemplary computer system in which or with which embodiments of the present invention can be utilized in accordance with embodiments of the present disclosure. As shown in FIG. 7, computer system (700) can include an external storage device (710), a bus (720), a main memory (730), a read only memory (740), a mass storage device (750), communication port (760), and a processor (770). A person skilled in the art will appreciate that the computer system may include more than one processor and communication ports. Examples of processor (770) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (770) may include various modules associated with embodiments of the present invention. Communication port (760) can be any of an RS-232 port for use with a modem-based dialup connection, a 10/100 Ethernet port, a Gigabit or 10 Gigabit port using copper or fiber, a serial port, a parallel port, or other existing or future ports. Communication port (760) may be chosen depending on a network, such a Local Area Network (LAN), Wide Area Network (WAN), or any network to which computer system connects. Memory (730) can be Random Access Memory (RAM), or any other dynamic storage device commonly known in the art. Read-only memory (740) can be any static storage device(s) e.g., but not limited to, a Programmable Read Only Memory (PROM) chips for storing static information e.g., start-up or BIOS instructions for processor 770. Mass storage (750) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus (720) communicatively couples' processor(s) (770) with the other memory, storage and communication blocks. Bus (720) can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor (770) to software system.

Optionally, operator and administrative interfaces, e.g., a display, keyboard, and a cursor control device, may also be coupled to bus (720) to support direct operator interaction with a computer system. Other operator and administrative interfaces can be provided through network connections connected through communication port (760). The external storage device (710) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides an efficient, improved, and reliable systems and methods for inter Radio Intelligent Controller (RIC) communication.

The present disclosure provides direct interface between two Radio RICs.

The present disclosure provides systems and methods for exchanging analytics data between RICs and to predict the load situations on probable candidate cells and take advanced measures to avoid such loading among those candidate cells.

The present disclosure enables near real-time control and optimize E2 nodes across the entire HetNet irrespective of number of Near-RT RICs deployed.

The present disclosure provides different architectural solutions to enable inter Near-RT RIC communications.

The present disclosure provides specific mechanisms of data exchange and the associated procedures.

The present disclosure provides split mechanism between different entities in a O-RAN architecture and the associated data/control flow mechanisms.

The present disclosure provides advanced measures for a traffic steering to appropriate cells of same or multi-RAT for the entire predicted time duration, including traffic switching and traffic splitting. These advanced measures aids in providing and sustaining good end-to-end Quality of Experience (QoE).

The present disclosure provides an upgradation to all the Interfaces by message setup request.

The present disclosure provides an advanced User Equipment that may intelligently select the optimized neighbour cells and RIC for best SON performance.

We claim:

1. A system for inter radio intelligent controller communication in an open Radio Access Network (O-RAN), the system comprising:

a network device equipped with a Non-Real Time Radio Intelligent Controller (Non-RT RIC) and communicatively coupled to a Near-Real Time Radio Intelligent Controller (Near-RT RIC), wherein the network device is further operatively coupled to a plurality of cells in a heterogenous network, the plurality of cells further communicatively coupled to the open radio access network unit (O-RAN), wherein said network device further comprises a processor and a memory, the memory comprises processor-executable instructions corresponding to one or more xAPPs associated with the Near-RT RIC, which on execution, cause the network device to:

receive, a first set of instructions to split the Near-RT RIC into a plurality of Near-RT RIC modules;

create a logical interface among the plurality of Near-RT RIC modules;

establish a communication pathway among the plurality of Near-RT RIC modules through the logical interface, wherein the communication pathway enable a near real-time control and optimization of a plurality of E2 Nodes across the entire heterogenous network;

detect, by a first Near RT RIC module, a new neighbour cell in an Automatic Neighbour Relation (ANR) module associated with a current RIC which is not supported or registered in the current RIC;

determine, by the first Near RT RIC module, location of the new neighbour cell; and send, by the first Near RT RIC module, the location of the new neighbour cell to a management entity associated with the network device via an O1 interface.

2. The system as claimed in claim 1, wherein the network device is further configured to:

send an RIC information request message to the management entity at the network device via the O1 interface, wherein the RIC information request message comprises of a cell Identity (ID) of the new neighbour cell;

search a cell-RIC map for the cell ID and locate one or more RIC details associated with the new neighbour cell; and respond, by the network device, with the new neighbour cell's RIC transport layer address by sending RIC Information Response message to the first Near-RT RIC module.

3. The system as claimed in claim 2, wherein the network device is further configured to:

initiate, by the first Near-RT RIC module, a setup procedure to establish an iNear-RT RIC interface link with a second Near-RT RIC module that is associated with the new neighbour cell's RIC, at the reception of the new neighbour cell's RIC transport layer address;

send, by the first Near-RT RIC module, a Near-RT RIC setup request message (INear-RT RIC) to the second Near-RT RIC module with a list of supported cells associated with the new neighbour cell;

acknowledge, by the second Near-RT RIC module, the Near-RT RIC setup request message (iNear-RT RIC);

update, by the second Near-RT RIC module, the list of supported cells with a received list of cells from the network device;

respond back, by the first Near-RT RIC module by sending a Near-RT RIC setup response message with the list of supported cells; and update, by the first Near-RT RIC module, the list of supported cells with the received list of cells to successfully establish between the link between the first Near-RT RIC module and the second Near-RT RIC module.

4. The system as claimed in claim 3, wherein the network device is further configured to:

send a Near-RT RIC cell information request message to the second Near-RT RIC module, by providing cell ID or a list of cell IDs, to request load information, measurement information, data analytics information.

5. The system as claimed in claim 4, wherein the network device is further configured to:

register, by the second the Near-RT RIC module, the Near-RT RIC cell information request; and respond back, by the second the Near-RT RIC module, with the latest load information, measurement information, data analytics information by sending the Near-RT RIC cell information response message to the first Near-RT RIC module.

6. The system as claimed in claim 5, wherein the network device is further configured to:

take decisions, by the first Near-RT RIC module, for a Self-Organizing Network (SON), on one or more cells which belong to a different RIC.

7. The system as claimed in claim 6, wherein the network device is further configured to:

update, by the second Near RT-RIC module, an RIC configuration of a iNear-RT RIC interface link when a cell or a group of cells are added or deleted and/or modified certain parameters of a cell/cells;

send a Near-RT RIC configuration update message to the first Near-RT RIC module;

update, by the first near RT-RIC module, the supported list of cells; and respond back by the first near RT-RIC module by sending the Near-RT RIC configuration update acknowledge message to the second Near-RT RIC module.

8. The system as claimed in claim 1, wherein the network device is further configured to:

send, by the second Near RT RIC module, a Near-RT RIC command with needed handover (HO) trigger details, and a predefined set of measurements to the first Near-RT RIC module, if the second Near-RT RIC module decides to alter the HO trigger details of a cell which belongs to a different RIC;

upon reception of the Near RT RIC command, acknowledge by the first Near-RT RIC-module, the Near-RT RIC command; and respond back, by the first Near-RT RIC module, the Near-RT RIC command acknowledge message to the second Near-RT RIC module.

9. The system as claimed in claim 1, wherein the network device is further configured to:

split data and control flow mechanism between the plurality of Near-RT RIC modules; and steer traffic to appropriate cells for an entire predicted time duration, wherein the steering of traffic comprises traffic switching and traffic splitting based on the split data and control flow mechanism.

10. A system for inter radio intelligent controller communication in an open Radio Access Network (O-RAN), the system comprising:

a network device communicably coupled to a Near-Real Time Radio Intelligent Controller (Near-RT RIC);

wherein the network device is further operatively coupled to a plurality of cells in a heterogenous network, the plurality of cells further communicatively coupled to the open radio access network unit (O-RAN), wherein said network device further comprises a processor and a memory, the memory comprises processor-executable instructions corresponding to one or more xAPPs associated with the Near-RT RIC, which on execution, cause the network device to:

receive, a first set of instructions to split the Near-RT RIC into a plurality of Near-RT RIC modules;

create a logical interface among the plurality of Near-RT RIC modules; and establish a communication pathway among the plurality of Near-RT RIC modules through the logical interface, wherein the communication pathway comprises:

initiate, by a first Near-RT RIC module, a setup procedure to establish an iNear-RT RIC interface link with a second Near-RT RIC module that is associated with the new neighbour cell's RIC, at the reception of the new neighbour cell's RIC transport layer address;

send, by the first Near-RT RIC module, a Near-RT RIC setup request message (INear-RT RIC) to the second Near-RT RIC module with a list of supported cells associated with the new neighbour cell;

acknowledge, by the second Near-RT RIC module, the Near-RT RIC setup request message (iNear-RT RIC);

update, by the second Near-RT RIC module, the list of supported cells with a received list of cells from the network device;

respond back, by the first Near-RT RIC module by sending a Near-RT RIC setup response message with the list of supported cells; and update, by the first Near-RT RIC module, the list of supported cells with the received list of cells to successfully establish between the link between the first Near-RT RIC module and the second Near-RT RIC module.

11. The system as claimed in claim 10, wherein the network device is further configured to send a setup request message, wherein said setup request message comprises at least of an IP address, a destination allocation ID, a source allocation ID, a data set of one or more connected E2 nodes of Near-RT RIC.

12. A method for inter radio intelligent controller communication in an open Radio Access Network (O-RAN), the method comprising:

receiving, by a network device, a first set of instructions to split a Near-Real Time Radio Intelligent Controller (Near-RT RIC) into a plurality of Near-RT RIC modules, wherein the network device is equipped with a Non-Real Time Radio Intelligent Controller (Non-RT RIC) and communicatively coupled to the Near-Real Time Radio Intelligent Controller (Near-RT RIC), wherein the network device is further operatively coupled to a plurality of cells in a heterogenous network, the plurality of cells further communicatively coupled to the open radio access network unit (O-RAN), wherein said network device further comprises a processor and a memory, the memory comprises processor-executable instructions corresponding to one or more xAPPs associated with the Near-RT RIC;

creating, by the network device, a logical interface among the plurality of Near-RT RIC modules;

establishing, by the network device, a communication pathway among the plurality of Near-RT RIC modules through the logical interface, wherein the communication pathway enable a near real-time control and optimization of a plurality of E2 Nodes across the entire heterogenous network;

detecting, by a first Near RT RIC module, a new neighbour cell in an Automatic Neighbour Relation (ANR) module associated with a current RIC which is not supported or registered in the current RIC;

determining, by the first Near RT RIC module, location of the new neighbour cell; and sending, by the first Near RT RIC module, the location of the new neighbour cell to a management entity associated with the network device via an O1 interface.

13. The method as claimed in claim 12, wherein the method further comprises the steps of:

sending, by the network device, an RIC information request message to the management entity at the network device via an 01 interface, wherein the RIC information request message comprises of a cell Identity (ID) of the new neighbour cell;

searching, by the network device, a cell-RIC map for a cell identity (ID) of the new neighbour cell and locate one or more RIC details associated with the new neighbour cell; and responding, by the network device, with the new neighbour cell's RIC transport layer address by sending RIC Information Response message to the first Near-RT RIC module.

14. The method as claimed in claim 13, wherein the method further comprises the steps of:

initiating, by the first Near-RT RIC module, a setup procedure to establish an iNear-RT RIC interface link with a second Near-RT RIC module that is associated with the new neighbour cell's RIC, at the reception of the new neighbour cell's RIC transport layer address;

sending, by the first Near-RT RIC module, a Near-RT RIC setup request message (INear-RT RIC) to the second Near-RT RIC module with a list of supported cells associated with the new neighbour cell;

acknowledging, by the second Near-RT RIC module, the Near-RT RIC setup request message (iNear-RT RIC);

updating, by the second Near-RT RIC module, the list of supported cells with a received list of cells from the network device; and responding back, by the first Near-RT RIC module by sending a Near-RT RIC setup response message with the list of supported cells; and updating, by the first Near-RT RIC module, the list of supported cells with the received list of cells to successfully establish between the link between the first Near-RT RIC module and the second Near-RT RIC module.

15. The method as claimed in claim 14, wherein the method further comprises the steps of:

sending, by the network device, a Near-RT RIC cell information request message to the second Near-RT RIC module, by providing cell ID or a list of cell IDs, to request load information, measurement information, data analytics information.

16. The method as claimed in claim 15, wherein the network device is further configured to:

registering, by the second the Near-RT RIC module, the Near-RT RIC cell information request; and responding back, by the second the Near-RT RIC module, with the latest load information, measurement information, data analytics information by sending the Near-RT RIC cell information response message to the first Near-RT RIC module.

17. The method as claimed in claim 16, wherein the method further comprises the steps of:

taking decisions, by the first Near-RT RIC module, for a Self-Organizing Network (SON), on one or more cells which belong to a different RIC.

18. The method as claimed in claim 17, wherein the method further comprises the steps of:

updating, by the second Near RT-RIC module, an RIC configuration of a $I_{Nea}$r-RT RIC interface link when a cell or a group of cells are added or deleted and/or modified certain parameters of a cell/cells;

sending, by the second Near RT-RIC module, a Near-RT RIC configuration update message to the first Near-RT RIC module; and updating, by the first near RT-RIC module, the supported list of cells; and responding back, by the first near RT-RIC module by sending the Near-RT RIC configuration update acknowledge message to the second Near-RT RIC module.

19. The method as claimed in claim 12, wherein the method further comprises the steps of:

sending, by the second Near RT RIC module, a Near-RT RIC command with needed handover (HO) trigger details, and a predefined set of measurements to the first Near-RT RIC module, if the second Near-RT RIC module decides to alter the HO trigger details of a cell which belongs to a different RIC;

upon reception of the Near RT RIC command, acknowledging by the first Near-RT RIC-module, the Near-RT RIC command; and responding back, by the first Near-RT RIC module, the Near-RT RIC command acknowledge message to the second Near-RT RIC module.

20. The method as claimed in claim 12, wherein the method further comprises the steps of:

splitting, by the network device, data and control flow mechanism between the plurality of Near-RT RIC modules; steering, by the network device, traffic to appropriate cells for an entire predicted time duration, wherein the steering of traffic comprises traffic switching and traffic splitting based on the split data and control flow mechanism.

21. A method for inter radio intelligent controller communication in an open Radio Access Network (O-RAN), the method comprising:

receiving, by a network device, a first set of instructions to split a Near-Real Time Radio Intelligent Controller (Near-RT RIC) into a plurality of Near-RT RIC modules, wherein the network device is communicatively coupled to a Near-Real Time Radio Intelligent Controller (Near-RT RIC), wherein the network device is further operatively coupled to a plurality of cells in a heterogenous network, the plurality of cells further communicatively coupled to the open radio access network unit (O-RAN), wherein said network device further comprises a processor and a memory, the memory comprises processor-executable instructions corresponding to one or more xAPPs associated with the Near-RT RIC;

creating a logical interface among the plurality of Near-RT RIC modules; and, establishing a communication pathway among the plurality of Near-RT RIC modules through the logical interface, wherein the communication pathway comprises steps as:

initiating, by a first Near-RT RIC module, a setup procedure to establish an iNear-RT RIC interface link with a second Near-RT RIC module that is associated with the new neighbour cell's RIC, at the reception of the new neighbour cell's RIC transport layer address;

sending, by the first Near-RT RIC module, a Near-RT RIC setup request message (INear-RT RIC) to the second Near-RT RIC module with a list of supported cells associated with the new neighbour cell;

acknowledging, by the second Near-RT RIC module, the Near-RT RIC setup request message (iNear-RT RIC);

updating, by the second Near-RT RIC module, the list of supported cells with a received list of cells from the network device; and responding back, by the first Near-RT RIC module by sending a Near-RT RIC setup response message with the list of supported cells; and updating, by the first Near-RT RIC module, the list of supported cells with the received list of cells to successfully establish between the link between the first Near-RT RIC module and the second Near-RT RIC module.

22. The method as claimed in claim 21, wherein the method further comprises of sending a setup request message, wherein said setup request message comprises at least of an IP address, a destination allocation ID, a source allocation ID, a data set of one or more connected E2 nodes of Near-RT RIC.

* * * * *